United States Patent
Galati et al.

(10) Patent No.: US 12,172,354 B2
(45) Date of Patent: *Dec. 24, 2024

(54) ELECTRIC ACTUATOR DRIVE FOR INJECTION MOLDING FLOW CONTROL

(71) Applicant: Synventive Molding Solutions, Inc., Peabody, MA (US)

(72) Inventors: Vito Galati, Rowley, MA (US); Sergio Ribeiro de Oliveira Antunes, Amesbury, MA (US)

(73) Assignee: SYNVENTIVE MOLDING SOLUTIONS, INC., Peabody, MA (US)

( * ) Notice: Subject to any disclaimer, the term of this patent is extended or adjusted under 35 U.S.C. 154(b) by 196 days.

This patent is subject to a terminal disclaimer.

(21) Appl. No.: 17/725,888

(22) Filed: Apr. 21, 2022

(65) Prior Publication Data

US 2022/0258398 A1   Aug. 18, 2022

Related U.S. Application Data

(63) Continuation-in-part of application No. 17/137,477, filed on Dec. 30, 2020, now Pat. No. 11,389,999, (Continued)

(51) Int. Cl.
*B29C 45/28* (2006.01)
*B29C 45/27* (2006.01)
*B29C 45/77* (2006.01)

(52) U.S. Cl.
CPC .......... *B29C 45/77* (2013.01); *B29C 45/2725* (2013.01); *B29C 45/281* (2013.01); (Continued)

(58) Field of Classification Search
CPC .................. B29C 45/281; B29C 45/77; B29C 2045/2824
See application file for complete search history.

(56) References Cited

U.S. PATENT DOCUMENTS 5,362,222 A   11/1994   Faig et al.
6,294,122 B1   9/2001   Moss et al.
(Continued)

FOREIGN PATENT DOCUMENTS

CN   104797397 A   7/2015
CN   109080084 A   12/2018
(Continued)

OTHER PUBLICATIONS

Chinese Office Action for Chinese Application No. 202080089060. 9; Report Mail Date Mar. 4, 2024 (30 Pages—with translation).
(Continued)

*Primary Examiner* — James Sanders
(74) *Attorney, Agent, or Firm* — CANTOR COLBURN LLP

(57) ABSTRACT

Injection molding apparatus (1) comprising:
an actuator (14, 940, 941, 942) comprising a rotor (940r, 941r, 942r) controllably rotatable by electric power, the actuator (14, 940, 941, 942) being interconnected to a controller (16) that generates drive signals (DC),
an electrical drive device (940d, 941d, 942d) comprising an interface that receives the drive signals (DC) and controllably distributes electrical energy or power in controllably varied amounts according to the drive signals (DC) to a driver (940dr, 941dr, 942dr) that drives the rotor (940r, 941r, 942r),
a valve pin (1040, 1041, 1042) having an axis (X) and a control surface (43, 45, 102m) adapted to interface with a complementary surface (47, 103s) in a downstream feed channel to vary rate of injection fluid flow to a cavity of a mold, and,
a sensor adapted to sense a property of the injection fluid upstream and away from a gate, the sensed property
(Continued)

being used in a program to controllably position the control surface relative to the complementary surface.

17 Claims, 26 Drawing Sheets

Related U.S. Application Data which is a continuation of application No. PCT/US2020/054354, filed on Oct. 6, 2020, application No. 17/725,888 is a continuation-in-part of application No. PCT/US2020/054354, filed on Oct. 6, 2020.

(60) Provisional application No. 62/923,656, filed on Oct. 21, 2019, provisional application No. 62/978,928, filed on Feb. 20, 2020.

(52) U.S. Cl.
CPC ............... *B29C 2045/2824* (2013.01); *B29C 2945/76006* (2013.01); *B29C 2945/76287* (2013.01); *B29C 2945/76545* (2013.01); *B29C 2945/76595* (2013.01); *B29C 2945/76765* (2013.01)

(56) References Cited

U.S. PATENT DOCUMENTS

| | | | |
|---|---|---|---|
| 6,309,208 | B1 | 10/2001 | Kazmer et al. |
| 6,464,909 | B1 | 10/2002 | Kazmer et al. |
| 7,597,828 | B2 | 10/2009 | Doyle et al. |
| 8,091,202 | B2 | 1/2012 | Galati et al. |
| 8,928,271 | B2 | 1/2015 | Bucella et al. |
| 9,048,708 | B2 | 6/2015 | Cloran et al. |
| 9,849,618 | B1 | 12/2017 | Tooman et al. |
| 2003/0122272 | A1 | 7/2003 | Smith et al. |
| 2004/0161490 | A1 | 8/2004 | Babin et al. |
| 2004/0166189 | A1 | 8/2004 | Babin |
| 2005/0123641 | A1 | 6/2005 | Kim |
| 2007/0273060 | A1 | 11/2007 | Doyle et al. |
| 2015/0306803 | A1 | 10/2015 | Antunes et al. |
| 2016/0229102 | A1 | 8/2016 | Galati |
| 2018/0079121 | A1 | 3/2018 | Lee et al. |
| 2018/0186051 | A1 | 7/2018 | Lee et al. |
| 2018/0194050 | A1 | 7/2018 | Galati |
| 2018/0264698 | A1 | 9/2018 | Bazzo et al. |

FOREIGN PATENT DOCUMENTS

| | | |
|---|---|---|
| DE | 20 2008 010772 U1 | 11/2008 |
| EP | 2679374 A1 | 1/2014 |
| EP | 2926972 A1 | 10/2015 |
| JP | H07 290485 A | 11/1995 |
| JP | 2004274834 A | 9/2004 |
| JP | 2005 053074 A | 3/2005 |
| WO | 2003/057448 A1 | 7/2003 |
| WO | 2014172100 A1 | 10/2014 |
| WO | 2014194037 A1 | 12/2014 |
| WO | 2017210169 A1 | 12/2017 |
| WO | 2018089243 A1 | 5/2018 |
| WO | 2018194961 A1 | 10/2018 |
| WO | 2019089243 A1 | 5/2019 |

OTHER PUBLICATIONS

Chinese Office Action for Chinese Application No. 202080030923.5; Report Mail Date Sep. 16, 2023 (66 Pages—with translation).
European Office Action for European Application No. 20714758.8; Report Mail Date Dec. 21, 2021 (4 Pages).
International Preliminary Report on Patentability in related international application PCT/US2020/046736 mailed on May 6, 2021. (81 Pages).
International Search Report and Written Opinion for International Application No. PCT/US2020/019669; International Filing Date Feb. 25, 2020; Report Mail Date May 26, 2020 (19 Pages).
International Search Report and Written Opinion for International Application No. PCT/US2020/046736; International Filing Date Aug. 18, 2020; Report Mail Date Feb. 3, 2021 (21 Pages).
Invitation to Pay Additional Fees and Partial Search Report for International Application No. PCT/US2020/046736; International Filing Date Aug. 18, 2020; Report Mail Date Mar. 11, 2021 (4 Pages).
Teknic Clear Path Integrated Servo Motors printout from www.teknic.com/products/clearpath-brushless-dc-servo-motors/ from Apr. 29, 2019.
International Search Report and Written Opinion in related application PCT/US2020/05354 issued on Feb. 17, 2021.
International Preliminary Report on Patentabiliity in related application PCT/US2020/05354 issued on Feb. 2, 2022.
International Search Report and Written Opinion in related application PCT/US2021/018973 issued on Apr. 28, 2021.
European Office Action for European Application No. 21712323.1; Report Mail Date Jul. 22, 2024 (4 Pages).
Chinese Office Action for Chinese Application No. 202080089060.9; Report Mail Date Sep. 12, 2024 (28 Pages—with translation).

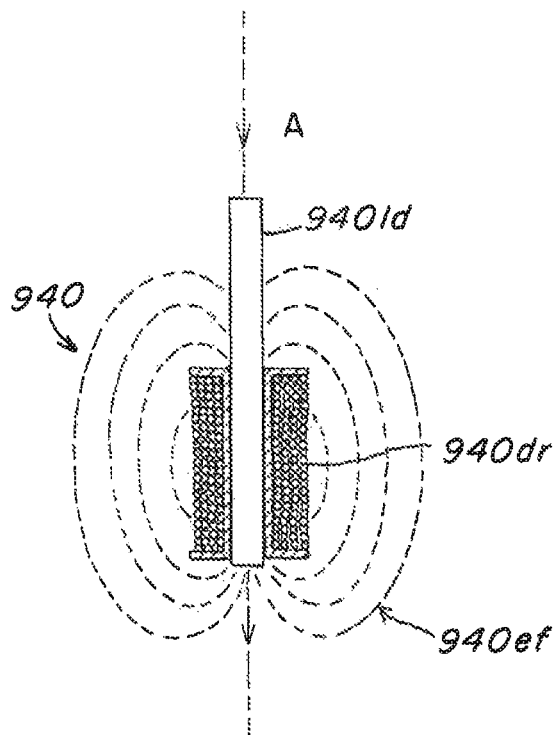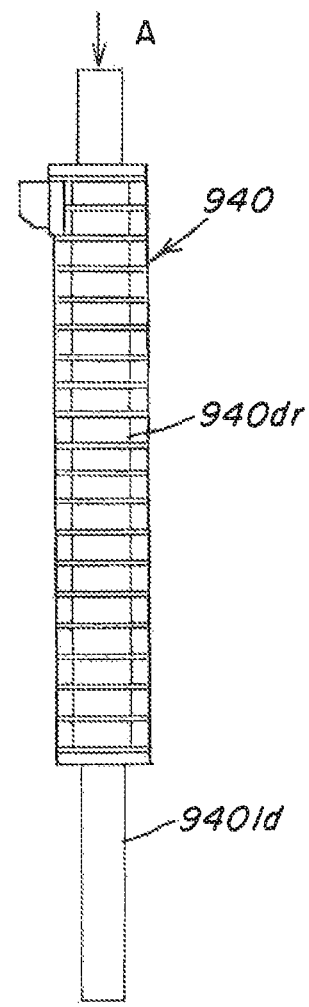
Fig. 8A
Fig. 9A

ELECTRIC ACTUATOR DRIVE FOR INJECTION MOLDING FLOW CONTROL

RELATED APPLICATIONS

This application claims the benefit of priority to U.S. application Ser. No. 62/923,656 filed Oct. 21, 2019 and to U.S. application Ser. No. 62/978,928 filed Feb. 20, 2020, the disclosures of both of which are incorporated by reference in their entirety as if fully set forth herein.

The disclosures of all of the following are incorporated by reference in their entirety as if fully set forth herein: U.S. Pat. Nos. 5,894,025, 6,062,840, 6,294,122 (7018), U.S. Pat. Nos. 6,309,208, 6,287,107, 6,343,921, 6,343,922, 6,254,377, 6,261,075, 6,361,300 (7006), U.S. Pat. Nos. 6,419,870, 6,464,909 (7031), U.S. Pat. No. 6,062,840 (7052), U.S. Pat. No. 6,261,075 (7052US1), U.S. Pat. Nos. 6,599,116, 7,234,929 (7075US1), U.S. Pat. No. 7,419,625 (7075US2), U.S. Pat. No. 7,569,169 (7075US3), U.S. Pat. No. 8,297,836 (7087) U.S. patent application Ser. No. 10/214,118, filed Aug. 8, 2002 (7006), U.S. Pat. No. 7,029,268 (7077US1), U.S. Pat. No. 7,270,537 (7077US2), U.S. Pat. No. 7,597,828 (7077US3), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068), U.S. application Ser. No. 10/101,278 filed Mar. 19, 2002 (7070) and PCT Application No. PCT/US11/062099 (7100WO0) and PCT Application No. PCT/US11/062096 (7100WO1), U.S. Pat. Nos. 8,562,336, 8,091,202 (7097US1) and U.S. Pat. No. 8,282,388 (7097US2), U.S. Pat. No. 9,724,861 (7129US4), U.S. Pat. No. 9,662,820 (7129US3), Publication No. WO2015006261 (7135WO0), Publication No. WO2014209857 (7134WO0), Publication No. WO2016153632 (7149WO2), International publication no. WO2016153704 (7149WO4), U.S. Pat. No. 9,205,587 (7117US0), U.S. application Ser. No. 15/432,175 (7117US2) filed Feb. 14, 2017, U.S. Pat. No. 9,144,929 (7118US0), U.S. Publication No. 20170341283 (7118US3), International Application WO2017214387 (7163WO0), International Application PCT/US17/043029 (7165WO0) filed Jul. 20, 2017, International Application PCT/US17/043100 (7165WO1), filed Jul. 20, 2017 and International Application PCT/US17/036542 (7163WO0) filed Jun. 8, 2017 and International Application WO2018129015 (7169WO0), international application WO2018148407 (7170WO0), international application WO2018183810 (7171WO), international application WO2018175362, international application WO2018194961 (7174WO0), international application WO2018200660 (7176WO0), international application WO2019013868 (7177), international application WO2019100085 (7178WO0), international application WO 2020068285 (7182WO0), international application WO2020176479 (7185WO0).

BACKGROUND OF THE INVENTION

Injection molding systems have been developed for controlling fluid flow with electric actuators and for controlling fluid flow upstream of the gate to the mold cavity as disclosed in U.S. Pat. Nos. 6,294,122 and 6,464,909 and 7,597,828 and 7,029,268 and 7,234,929 the disclosures of all of which are incorporated by reference as if fully set forth in their entirety herein.

SUMMARY OF THE INVENTION

In accordance with the invention there is provided an injection molding apparatus comprising:
  an injection molding machine;
  a controller arranged to generate drive signals or cause a generation of drive signals;
  a manifold arranged to receive an injection material under pressure from the injection molding machine and to deliver at least some of the injection material into a cavity of a mold;
  a gate leading to the cavity of the mold;
  a valve pin having a shaft, the shaft having an axis;
  an actuator controllably drivable by electric power, the actuator having a driver arranged to drive the valve pin wherein the valve pin is interconnected at an upstream end to the actuator in an arrangement that permits the valve pin to be controllably drivable by the actuator along a linear path of travel upstream and downstream through a downstream feed channel, the downstream feed channel arranged to receive and deliver at least some of the injection material into the cavity, the valve pin and the downstream feed channel being adapted to interface with each other to vary rate or velocity of flow of the injection material to and through the gate;
  an electrical drive device having an interface arranged to receive the drive signals and controllably distribute electrical energy to the actuator driver in controllably varied amounts according to the drive signals; and
  a pressure sensor arranged to sense pressure of the injection material within a channel upstream and away from the gate, wherein the controller is arranged to execute a program that receives signals from the pressure sensor indicative of the sensed pressure, the program having instructions that generate the drive signals based on the received signals, the drive signals being sent to the driver via the electrical drive device, the instructions controlling interfacing of the valve pin and the downstream feed channel to control the rate or velocity of flow of the injection material during the course of an injection cycle.

In such an apparatus, the program typically includes instructions that utilize a position signal to adjust axial position of the valve pin by a travel distance or amount that causes interfacing of the valve pin with the downstream feed channel to adjust real time pressure of the injection material at one or more times over the course of the injection cycle to a value that approaches or matches a predetermined target pressure value for the one or more times over the course of the injection cycle.

In such an apparatus the program can includes instructions that utilize a predetermined error value to determine the travel distance, the predetermined error value corresponding or being proportional to one or more of (a) an error in accuracy of the value of sensed pressure and (b) a difference in value between sensed pressure and the predetermined target pressure.

In such an apparatus the valve pin and the downstream feed channel are preferably adapted to interface with each other to vary rate or velocity of flow of injection material at an axial position upstream and away from the gate.

In such an apparatus the pressure sensor preferably senses pressure of the injection material and is adapted to generate a signal indicative of sensed pressure that is received at the controller, the instructions being adapted to compare the sensed pressure to a target pressure and adjust axial position of the valve pin such that injection material pressure is adjusted to track the target pressure.

In such an apparatus, the pressure sensor is preferably adapted to sense the injection material pressure at a position downstream of an axial position at which the valve pin and the downstream channel interface with each other to vary rate or velocity of flow of the injection material.

In such an apparatus the valve pin can include a control surface and the downstream feed channel has a complementary surface adapted to interface with the control surface to controllably vary rate or velocity of flow according to controlled axial positioning of the control surface relative to the complementary surface of the downstream feed channel.

In such an apparatus the electrical drive device typically includes a pulse-width modulator (PWM) that converts received electrical energy or power into waveforms or duty cycles, each waveform or duty cycle being adapted to drive a corresponding phase-coil of the actuator driver.

In such an apparatus the pulse-width modulator (PWM) can include an inverter or a comparator.

In such an apparatus the electrical drive typically includes one or the other or both of a digital signal receiving and transmitting device, wherein: the digital signal receiving and transmitting device is adapted to receive and transmit digital signals between the electrical drive and the controller of the injection molding apparatus, and wherein the digital signals include one or more control signals, where the one or more control signals are digital control signals received from the controller.

In such an apparatus the actuator can have a housing that houses the driver, the housing being adapted to support the rotor, the electrical drive device being housed within or by the housing or being mounted on or to the housing, and wherein the housing is mounted in proximity or disposition relative to a heated manifold such that one or the other or both of the housing and the electrical drive is or are in substantial heat communication or contact with the heated manifold.

In such an apparatus the housing of the actuator can be interconnected to a linear travel converter in an arrangement wherein the valve pin is adapted to be driven along a linear axis (X) that is non coaxial relative to a drive axis (Y), the linear travel converter being mounted on or to or disposed in heat conductive communication with the heated manifold.

In such an apparatus the valve pin can have an upstream end coupled to the driver, a downstream end that closes the gate on downstream movement of the valve pin to a gate closed position, the control surface being disposed in a selected axial position intermediate the upstream and downstream ends that is adapted to interact with the complementary surface to decrease rate of material flow on upstream movement of the valve pin through a selected path of travel and to increase rate of material flow on downstream movement of the valve pin through the selected path of travel.

In another aspect of the invention there is provided a method to perform an injection molding cycle comprising:
providing, with an injection molding machine, an injection molding material under pressure,
providing a valve pin having a shaft, the shaft having an axis (X),
adapting the valve pin to interface with a downstream feed channel to vary rate or velocity of flow of the injection material to the mold,
receiving the injection molding material at a manifold,
directing, with a controller, a generation of drive signals adapted to drive a driver arranged to controllably drive the valve pin,
routing at least some of the injection material through the downstream feed channel into a cavity of a mold, said routing including:
providing a pressure sensor that senses pressure of the injection material upstream and away from the gate and sends signals indicative of the sensed pressure to the controller,
providing the controller with a program that generates the drive signals based on the pressure signals.
receiving the drive signals at an interface of an electrical drive device, controllably distributing electrical energy to the driver in controllably varied amounts according to the drive signals received at the interface.

In another aspect of the invention there is provided an injection molding apparatus comprising:
an injection molding machine,
a controller arranged to generate drive signals or cause a generation of drive signals,
a manifold arranged to receive an injection material under pressure from the injection molding machine and to deliver at least some of the injection material into a cavity of a mold having a cavity,
a valve pin having a shaft, the shaft having an axis (X),
at least one actuator controllably drivable by electric power, the actuator having a driver arranged to drive the valve pin,
a controller arranged to generate drive signals or cause a generation of drive signals,
the valve pin being interconnected at an upstream end to the driver in an arrangement wherein the valve pin is controllably drivable by the driver along a linear path of travel upstream and downstream through a downstream feed channel arranged to receive and deliver at least some of the injection material into the cavity, the valve pin and the downstream feed channel being adapted to interface with each other to vary rate or velocity of flow of the injection material to and through a gate leading to the cavity of the mold,
an electrical drive device having an interface arranged to receive the drive signals and controllably distribute electrical energy to the driver in controllably varied amounts according to the drive signals,
the electrical drive device and the controller being adapted to receive and transmit digital signals between the electrical drive device the controller, wherein the digital signals include one or more drive signals received by the electrical drive device from the controller,
the controller having a program that receives signals from one or more of a pressure sensor that senses pressure of the injection material or a position sensor that senses position of the actuator or the valve pin, the program having instructions that generate the drive signals based on the received signals, the drive signals being sent to the driver via the electrical drive device, the instructions controlling interfacing of the valve pin and the downstream feed channel to control the rate or velocity of flow of the injection material during the course of an injection cycle.

In such an apparatus the digital control signals received by the actuator preferably include one or more of differential position commands, differential current commands, and differential velocity commands.

In such an apparatus the digital signals can include one or more feedback signals from the actuator to the controller corresponding to operation of one or more of the actuator and the actuator driver.

In such an apparatus the valve pin and the downstream channel are typically adapted to interface with each other to vary rate or velocity of flow of the injection material at an axial position upstream and away from the gate.

In such an apparatus the actuator can have a housing that houses the driver, the electrical drive device being housed within or by the housing or being mounted on or to the housing, wherein the housing is mounted in proximity or disposition relative to a heated manifold such that one or the other or both of the housing and the electrical drive is or are in substantial heat communication or contact with the heated manifold.

In such an apparatus the electrical drive device preferably includes a pulse-width modulator (PWM) that converts received electrical energy into waveforms or duty cycles, each waveform or duty cycle being adapted to drive a corresponding phase-coil of the actuator driver.

In another aspect of the invention there is provided an injection molding apparatus (1) comprising: an injection molding machine (500), a manifold (15) that receives an injection fluid material (13) under pressure from the injection molding machine (500), a mold (25, 27, 300) having a cavity (5, 30) and at least one valve comprising:

an actuator (14, 940, 941, 942) comprising a rotor (940r, 941r, 942r) controllably rotatable by electric power, the actuator (14, 940, 941, 942) being interconnected to a controller (16) that generates digital signals (DC) that are received by a drive device that is (940d, 941d, 942d) mounted to or housed within an actuator housing (940h, 941h, 942h) that houses the rotor (940r, 941r, 942r), the drive device utilizing the drive signals (DC) to control rotational movement of the rotor (940r, 941r, 942r), a valve pin (1040, 1041, 1042) comprising a shaft having an axis (X) and a protrusion (102) disposed at a selected position along the axis of the shaft, the valve pin being interconnected at an upstream end to the rotor in an arrangement wherein the valve pin is controllably drivable along a linear path of travel (XX) upstream and downstream through a downstream feed channel (17, 19, 160, 940c, 941c, 942c) that routes the injection material to and through a gate leading to the cavity of the mold, the protrusion (102) having a control surface (45, 102m) and the downstream feed channel having a complementary surface (47, 103s) adapted to controllably vary rate of velocity of flow according to controlled axial positioning of the control surface (45, 102m) of the protrusion (102) relative to the complementary surface (47, 103s) of the downstream feed channel (17, 19, 160, 940c, 941c, 942c).

The actuator typically includes a driver (940dr, 941dr, 942dr) that receives electrical energy or power from the drive device (940d, 941d, 942d), the drive device (940d, 941d, 942d) comprising an interface that receives and controllably distributes electrical energy or power in controllably varied amounts during the course of an injection cycle to the driver (940dr, 941dr, 942dr).

The actuator housing can be adapted to house the electrical drive (940d, 941d, 942d), the rotor (940r, 941r, 942r) and the driver (940dr, 941dr, 942dr) and to support the rotor (940r, 941r, 942r) such that the rotor is drivably rotatable, wherein the actuator housing (940h, 941h, 942h) is mounted in proximity or disposition relative to the heated manifold (40) such that one or the other or both of the housing (940h, 941h, 942h) and the electrical drive (940d, 941d, 942d) is or are in substantial heat communication with the heated manifold (40).

In another aspect of the invention there is provided an apparatus (1) comprising: an injection molding machine (500), a manifold (15) that receives an injection fluid material (13) under pressure from the injection molding machine (500), a mold (25, 27, 300) having a cavity (5, 30) and at least one valve comprising:

an actuator (14, 940, 941, 942) comprising a rotor (940r, 941r, 942r) controllably rotatable by electric power, the actuator (14, 940, 941, 942) being interconnected to a controller (16) that generates control signals, a drive device (940d, 941d, 942d) interconnected to the controller (16), the drive device comprising an interface that receives and controllably distributes electrical energy or power in controllably varied amounts during the course of an injection cycle to a driver (940dr, 941dr, 942dr) for the rotor (940r, 941r, 942r) according to the control signals, a valve pin (1040, 1041, 1042) comprising a shaft having an axis (X) and a protrusion (102) disposed at a selected position along the axis of the shaft, the valve pin being interconnected at an upstream end to the rotor in an arrangement wherein the valve pin is controllably drivable along a linear path of travel (XX) upstream and downstream through a downstream feed channel (17, 19, 160, 940c, 941c, 942c) that routes the injection material to and through a gate leading to the cavity of the mold, the protrusion (102) having a control surface (45, 102m) and the downstream feed channel having a complementary surface (47, 103s) adapted to controllably vary rate of velocity of flow according to controlled axial positioning of the control surface (45, 102m) of the protrusion (102) relative to the complementary surface (47, 103s) of the downstream feed channel (17, 19, 160, 940c, 941c, 942c).

In such an apparatus, the controller (16) can generate digital control signals (DC), the driver being adapted to receive and utilize the digital control signals (DC) to control rotational movement of the rotor (940r, 941r, 942r).

The drive device is (940d, 941d, 942d) is typically mounted to or housed within an actuator housing (940h, 941h, 942h) that houses the rotor (940r, 941r, 942r).

The actuator housing is typically adapted to house the drive device (940d, 941d, 942d), the rotor (940r, 941r, 942r) and the driver (940dr, 941dr, 942dr) and to support the rotor (940r, 941r, 942r) such that the rotor is drivably rotatable, wherein the actuator housing (940h, 941h, 942h) is mounted in proximity or disposition relative to the heated manifold (40) such that one or the other or both of the housing (940h, 941h, 942h) and the electrical drive (940d, 941d, 942d) is or are in substantial heat communication with the heated manifold (40).

In another aspect of the invention there is provided an injection molding apparatus (1) comprising: an injection molding machine (500), a manifold (15) that receives an injection fluid material (13) under pressure from the injection molding machine (500), a mold (25, 27, 300) having a cavity (5, 30) and at least one valve comprising:

an actuator (14, 940, 941, 942) comprising a rotor (940r, 941r, 942r) controllably rotatable by electric power, the actuator (14, 940, 941, 942) being interconnected to a controller (16) that generates control signals that control distribution of electrical energy or power in controllably varied amounts during the course of an injection cycle to a driver (940dr, 941dr, 942dr) for the rotor (940r, 941r, 942r) according to the control signals, a valve pin (1040, 1041, 1042) comprising a shaft having an axis (X) and a protrusion (102) disposed at a selected position along the axis of the shaft, the valve pin being interconnected at an upstream end to the rotor in an arrangement wherein the valve pin is controllably drivable along a linear path of travel (XX) upstream and downstream through a downstream feed channel (17, 19, 160, 940c, 941c, 942c) that routes the injection material to and through a gate leading to the cavity of the mold, the protrusion (102) having a control surface (45, 102m) and the downstream feed channel having a complementary surface (47, 103s) adapted to (a) controllably vary rate of velocity of flow according to controlled axial positioning of the control surface (45, 102m) of the protrusion (102) relative to the complementary surface (47, 103s) of the downstream feed channel (17, 19, 160, 940c, 941c, 942c) and (b) such that reactive forces of the injection fluid material (13) against the valve pin (1040, 1041, 1042) enable use of an electric motor having a maximum power or energy output of about.

Such an apparatus typically further comprises a drive device (940d, 941d, 942d) interconnected to the controller (16), the drive device comprising an interface that receives and controllably distributes the electrical energy or power in controllably varied amounts during the course of an injection cycle to the driver (940dr, 941dr, 942dr) for the rotor (940r, 941r, 942r) according to the control signals generated by the controller (16).

In another aspect of the invention there is provided an injection molding apparatus (1) comprising: an injection molding machine (500), a manifold (15) that receives an injection material (18) under pressure from the injection molding machine (500), a mold (25, 27, 300) having a cavity (5, 30) and at least one valve comprising: an actuator (14, 940, 941, 942) comprising a rotor (940r, 941r, 942r) controllably rotatable by electric power, the actuator (14, 940, 941, 942) being interconnected to a controller (16) that generates drive signals (DC), an electrical drive device (940d, 941d, 942d) comprising an interface that receives the drive signals (DC) and controllably distributes electrical energy or power in controllably varied amounts according to the drive signals (DC) to a driver (940dr, 941dr, 942dr) that drives the rotor (940r, 941r, 942r), a valve pin (1040, 1041, 1042) comprising a shaft having an axis (X) and a control surface (43, 45, 102m) disposed at a selected position along the axis (X) of the shaft, the valve pin being interconnected at an upstream end to the rotor in an arrangement wherein the valve pin is controllably drivable along a linear path of travel (XX) upstream and downstream through a downstream feed channel (17, 19, 160, 940c, 941c, 942c) that routes the injection material to and through a gate (7, 9, 32, 34, 36) leading to the cavity of the mold, the downstream feed channel having a complementary surface (47, 103s) adapted to interface with the control surface (43, 45, 102m) to controllably vary rate or velocity of flow according to controlled axial positioning of the control surface (43, 45, 102m) relative to the complementary surface (47, 103s) of the downstream feed channel (17, 19, 160, 940c, 941c, 942c).

The complementary surface (47, 103s) is preferably disposed upstream and away from the gate (7, 9, 32, 34, 36).

The electrical drive device (940d, 941d, 942d) typically receives electrical energy or power from a power source (PS) and controllably distributes the received electrical energy or power in controllably varied amounts during the course of an injection cycle to the driver (940dr, 941dr, 942dr).

The electrical drive device (940d, 941d, 942d) typically includes a pulse-width modulator (PWM) that converts received electrical energy or power into sinusoidal voltage waveforms or duty cycles, each sinusoidal voltage waveform or duty cycle being adapted to drive a corresponding phase-coil of the actuator driver (940dr, 941dr, 942dr).

The pulse-width modulator (PWM) typically comprises an inverter or a comparator.

The pulse width modulator (PWM) can comprise a three-phase inverter that converts electrical energy or power received from the interface into three sinusoidal voltage waveforms or duty cycles, each one of the three sinusoidal voltage waveforms or duty cycles being adapted to drive a corresponding one of three phase-coils of the actuator driver.

The electrical energy or power received at or by the pulse width modulator (PWM) typically comprises a DC bus voltage.

The interface of the electrical drive (940d, 941d, 942d) can be adapted to receive one or more control signals from a controller (16) of the injection molding apparatus (10) and to convert electrical energy or power received from the power source (PS) into sinusoidal waveforms or duty cycles based on the one or more control signals.

The interface is typically comprised of the pulse width modulator (PWM) which converts electrical energy or power received from the power source into sinusoidal waveforms or duty cycles based on the one or more control signals.

The one or more control signals received by the interface can contain control information causing the pulse width modulator (PWM) to convert the received electrical energy or power into sinusoidal waveforms or duty cycles adapted to drive the corresponding phase-coils of the actuator driver to adjust one or more of a position, a velocity or torque of the actuator rotor (940r, 941r, 942r).

The one or more control signals can comprise analog electrical signals received at the electrical drive from the controller (16).

The electrical drive (940d, 941d, 942d) typically comprises one or the other or both of a digital signal receiving (16r) and transmitting (16s) device, wherein: the digital signal receiving and transmitting device is adapted to receive (16r) and transmit (16s) digital signals between the electrical drive (940d, 941d, 942d) and the controller (16) of the injection molding apparatus (10); and wherein, the digital signals include the one or more control signals, where the one or more control signals are digital control signals received from the controller.

The digital control signals can include one or more of differential position commands, differential current commands, and differential velocity commands.

The digital signal receiving and transmitting device (16r, 16s) is typically adapted to receive digital signals from the actuator, wherein the digital signals received from the actuator include one or more feedback signals corresponding to operation of one or more of the actuator and the actuator rotor.

The pulse width modulator (PWM) typically converts the electrical energy or power received from the interface into sinusoidal waveforms or duty cycles adapted to drive the corresponding phase-coils of the actuator driver based at least in part on the one or more feedback signals. The one or more feedback signals received from the actuator can include one or more of an incremental feedback signal and an absolute feedback signal.

The actuator typically has a housing (940h, 941h, 942h) that houses the rotor (940r, 941r, 942r) and the driver (940dr, 941dr, 942dr), the housing being adapted to support the rotor (940r, 941r, 942r), the electrical drive device (940d, 941d, 942d) being housed within or by the housing (940h, 941h, 942h) or being mounted on or to the housing (940h, 941h, 942h), wherein the housing (940h, 941h, 942h) is mounted in proximity or disposition relative to the heated manifold (40) such that one or the other or both of the housing (940h, 941h, 942h) and the electrical drive (940d, 941d, 942d) is or are in substantial heat communication or contact with the heated manifold (40).

The housing (940h, 941h, 942h) can be mounted on or to a clamping plate (80) in an arrangement such that one or the other or both of the housing (940h, 941h, 942h) and the electrical drive (940d, 941d, 942d) are in substantial heat or thermal communication with the heated manifold (40).

The housing (940h, 941h, 942h) of the actuator can be interconnected to a linear travel converter (940l, 941l, 942l) in an arrangement wherein the valve pin (1040, 1041, 1042) is adapted to be driven along a linear axis (X) that is non coaxial relative to the drive axis (y), the linear travel converter (940l, 941l, 942l) being mounted on or to or disposed in heat conductive communication with the heated manifold (40).

The linear travel converter (940l, 941l, 942l) is mounted on or to one or the other or both of the heated manifold (40) or a clamping plate (80).

The linear travel converter typically includes a converter housing (940lh) mounted in direct or indirect heat conductive contact to the heated manifold (40), the housing (940h, 941h, 942h) being connected to the converter housing (940lh) in thermally conductive contact therewith.

The linear travel converter typically includes a converter housing (940lh) mounted on or to mounts comprised of a metal material that are mounted in direct metal to metal contact or communication with the heated manifold (40).

The valve pin (1040, 1041, 1042) can have an upstream end (1041ue) coupled to the actuator, a downstream end (1041de) that closes the gate on downstream movement of the valve pin to a gate closed position, the control surface (43, 45, 102m) being disposed in a selected axial position intermediate the upstream (1041ue) and downstream ends (1041de) that is adapted to interact with the complementary surface (103s) to decrease rate of material flow on upstream movement of the valve pin through a selected path of travel (CP) and to increase rate of material flow on downstream movement of the valve pin through the selected path of travel (CP).

Such an apparatus typically includes a sensor (PS0, PS1, PS1a, PS2, PS2a) that senses pressure of the injection material, the sensor (PS0, PS1, PS1a, PS2, PS2a) sending a signal indicative of sensed pressure to the controller (16), the controller including instructions that compare the sensed pressure to a target pressure and adjust axial position of the valve pin such that material pressure is adjusted to track the target pressure.

The sensor is preferably adapted to sense the injection material pressure at a position downstream of the control surface of the valve pin.

The actuator typically includes a driver (940dr, 941dr, 942dr) that receives electrical energy or power from the drive device (940d, 941d, 942d), the drive device (940d, 941d, 942d) comprising an interface that receives and controllably distributes electrical energy or power in controllably varied amounts during the course of an injection cycle to the driver (940dr, 941dr, 942dr).

The complementary surface (47, 103s) and the control surface (43, 45, 102m) typically have a maximum diameter or radial dimension of about 12 mm.

The complementary surface (47, 103s) and the control surface (43, 45, 102m) can have a maximum diameter or radial dimension of about 10 mm.

In another aspect of the invention there is provided an injection molding apparatus (1) comprising: an injection molding machine (500), a manifold (15) that receives an injection material (13) under pressure from the injection molding machine (500), a mold (25, 27, 300) having a cavity (5, 30) and at least one valve comprising: an actuator (14, 940, 941, 942) comprising a rotor (940r, 941r, 942r) controllably rotatable by electric power, the actuator (14, 940, 941, 942) being interconnected to a controller (16) that generates drive signals (DC), an electrical drive device (940d, 941d, 942d) comprising an interface that receives the drive signals (DC) and controllably distributes electrical energy or power in controllably varied amounts according to the drive signals (DC) to a driver (940dr, 941dr, 942dr) that drives the rotor (940r, 941r, 942r), a valve pin (1040, 1041, 1042) comprising a shaft having an axis (X), the valve pin being interconnected at an upstream end (1041ue) to the rotor in an arrangement wherein the valve pin is controllably drivable by the actuator (14, 940, 941, 942) along a linear path of travel (XX) upstream and downstream through a downstream feed channel (940c, 941c, 942c), the valve pin and the downstream feed channel being adapted to interface with each other to vary rate or velocity of flow of the injection material to and through a gate (7, 9, 32, 34, 36) leading to the cavity of the mold, a sensor (PS0, PS1, PS1a, PS2, PS2a) that senses pressure of the injection material within a channel (17, 19, 940c, 941c, 942c, 5011) upstream of the gate (7, 9, 32, 34, 36), a controller (16) including a program that receives signals from the sensor indicative of the sensed pressure, the program generating instructions based on the received signals that are sent to the actuator (14, 940, 941, 942) via the electrical drive device (940d, 941d, 942d), the instructions controlling interfacing of the valve pin and the downstream feed channel to control the rate or velocity of flow of the injection material during the course of an injection cycle.

In such an apparatus, the downstream feed channel preferably has a complementary surface (47, 103s) adapted to interface with the control surface (43, 45, 102m) such that reactive upstream forces exerted on the valve pin (1040, 1041, 1042) are minimized.

In such an apparatus the downstream feed channel typically has a complementary surface (47, 103s) adapted to interface with the control surface (43, 45, 102m) at a position disposed upstream and away from the gate (32, 34, 36).

In such an apparatus the electrical drive (940d, 941d, 942d) can comprise one or the other or both of a digital signal receiving (16r) and transmitting (16s) device, wherein: the digital signal receiving and transmitting device is adapted to receive (16r) and transmit (16s) digital signals between the electrical drive (940d, 941d, 942d) and the controller (16) of the injection molding apparatus (10); and wherein, the digital signals include the one or more control signals, where the one or more control signals are digital control signals received from the controller (16).

Such an apparatus can include a position sensor (POS, POS0, POS1, POS2) that sends a position signal (POS0s, POS1s, POS2s) indicative of position of the valve pin (1040,

1041, 1042) to the controller (16), the program including instructions that utilize the position signal to instruct the actuator (14, 940, 941, 942) to move the valve pin (1040, 1041, 1042) to one or more predetermined positions during the course of an injection cycle.

In such an apparatus the actuator (940, 941, 942) and the controller (16) can be adapted to receive (16r) and transmit (16s) digital signals between the actuator and the controller (16), wherein the digital signals include one or more control signals received by the actuator (16r) from the controller (16).

In such an apparatus the downstream feed channel (17, 19, 160, 940c, 941c, 942c) can be adapted to deliver injection material to a further downstream channel (160, 942c2) having a channel axis (Y, Z) that is non coaxial relative to the linear path of travel (XX) of the valve pin.

In another aspect of the invention there is provided an injection molding apparatus (1) comprising: an injection molding machine (500), a manifold (15) that receives an injection material (13) under pressure from the injection molding machine (500), a mold (25, 27, 300) having a cavity (5, 30) and at least one valve comprising: an actuator (14, 940, 941, 942) comprising a rotor (940r, 941r, 942r) controllably rotatable by electric power, the actuator (14, 940, 941, 942) being interconnected to a controller (16) that generates drive signals (DC), an electrical drive device (940d, 941d, 942d) comprising an interface that receives the drive signals (DC) and controllably distributes electrical energy or power in controllably varied amounts according to the drive signals (DC) to a driver (940dr, 941dr, 942dr) that drives the rotor (940r, 941r, 942r), a valve pin (1040, 1041, 1042) comprising a shaft having an axis (X) and a control surface (43, 45, 102m), the valve pin being interconnected at an upstream end to the rotor in an arrangement wherein the valve pin is controllably drivable along a linear path of travel (XX) upstream and downstream through a downstream feed channel (17, 19, 160, 940c, 941c, 942c) that routes the injection material to and through a gate (7, 9, 32, 34, 36) leading to the cavity of the mold, the downstream feed channel having a complementary surface (47, 103s) adapted to interface with the control surface (43, 45, 102m) such that reactive upstream forces exerted on the valve pin (1040, 1041, 1042) are minimized.

In such an apparatus, the downstream feed channel preferably has a complementary surface (47, 103s) adapted to interface with the control surface (43, 45, 102m) such that reactive upstream forces exerted on the valve pin (1040, 1041, 1042) are minimized.

In such an apparatus the downstream feed channel typically has a complementary surface (47, 103s) adapted to interface with the control surface (43, 45, 102m) at a position disposed upstream and away from the gate (32, 34, 36).

In such an apparatus the electrical drive (940d, 941d, 942d) can comprise one or the other or both of a digital signal receiving (16r) and transmitting (16s) device, wherein: the digital signal receiving and transmitting device is adapted to receive (16r) and transmit (16s) digital signals between the electrical drive (940d, 941d, 942d) and the controller (16) of the injection molding apparatus (10); and wherein, the digital signals include the one or more control signals, where the one or more control signals are digital control signals received from the controller (16).

Such an apparatus can include a position sensor (POS, POS0, POS1, POS2) that sends a position signal (POS0s, POS1s, POS2s) indicative of position of the valve pin (1040, 1041, 1042) to the controller (16), the program including instructions that utilize the position signal to instruct the actuator (14, 940, 941, 942) to move the valve pin (1040, 1041, 1042) to one or more predetermined positions during the course of an injection cycle.

In such an apparatus the actuator (940, 941, 942) and the controller (16) can be adapted to receive (16r) and transmit (16s) digital signals between the actuator and the controller (16), wherein the digital signals include one or more control signals received by the actuator (16r) from the controller (16).

In such an apparatus the downstream feed channel (17, 19, 160, 940c, 941c, 942c) can be adapted to deliver injection material to a further downstream channel (160, 942c2) having a channel axis (Y, Z) that is non coaxial relative to the linear path of travel (XX) of the valve pin In another aspect of the invention there is provided an injection molding apparatus (1) comprising: an injection molding machine (500), a manifold (15) that receives an injection material (13) under pressure from the injection molding machine (500), a mold (25, 27, 300) having a cavity (5, 30) and at least one valve comprising: an actuator (14, 940, 941, 942) comprising a rotor (940r, 941r, 942r) controllably rotatable by electric power, the actuator (14, 940, 941, 942) being interconnected to a controller (16) that generates drive signals (DC), an electrical drive device (940d, 941d, 942d) comprising an interface that receives the drive signals (DC) and controllably distributes electrical energy or power in controllably varied amounts according to the drive signals (DC) to a driver (940dr, 941dr, 942dr) that drives the rotor (940r, 941r, 942r), a valve pin (1040, 1041, 1042) comprising a shaft having an axis (X) and a control surface (43, 45, 102m), the valve pin being interconnected at an upstream end to the rotor in an arrangement wherein the valve pin is controllably drivable along a linear path of travel (XX) upstream and downstream through a downstream feed channel (17, 19, 160, 940c, 941c, 942c) that routes the injection material to and through a gate (7, 9, 32, 34, 36) leading to the cavity of the mold, the downstream feed channel having a complementary surface (47, 103s) adapted to interface with the control surface (43, 45, 102m) at a position disposed upstream and away from the gate (32, 34, 36).

In such an apparatus, the downstream feed channel preferably has a complementary surface (47, 103s) adapted to interface with the control surface (43, 45, 102m) such that reactive upstream forces exerted on the valve pin (1040, 1041, 1042) are minimized.

In such an apparatus the downstream feed channel typically has a complementary surface (47, 103s) adapted to interface with the control surface (43, 45, 102m) at a position disposed upstream and away from the gate (32, 34, 36).

In such an apparatus the electrical drive (940d, 941d, 942d) can comprise one or the other or both of a digital signal receiving (16r) and transmitting (16s) device, wherein: the digital signal receiving and transmitting device is adapted to receive (16r) and transmit (16s) digital signals between the electrical drive (940d, 941d, 942d) and the controller (16) of the injection molding apparatus (10); and wherein, the digital signals include the one or more control signals, where the one or more control signals are digital control signals received from the controller (16).

Such an apparatus can include a position sensor (POS, POS0, POS1, POS2) that sends a position signal (POS0s, POS1s, POS2s) indicative of position of the valve pin (1040, 1041, 1042) to the controller (16), the program including instructions that utilize the position signal to instruct the actuator (14, 940, 941, 942) to move the valve pin (1040,

1041, 1042) to one or more predetermined positions during the course of an injection cycle.

In such an apparatus the actuator (940, 941, 942) and the controller (16) can be adapted to receive (16r) and transmit (16s) digital signals between the actuator and the controller (16), wherein the digital signals include one or more control signals received by the actuator (16r) from the controller (16).

In such an apparatus the downstream feed channel (17, 19, 160, 940c, 941c, 942c) can be adapted to deliver injection material to a further downstream channel (160, 942c2) having a channel axis (Y, Z) that is non coaxial relative to the linear path of travel (XX) of the valve pin In another aspect of the invention there is provided an injection molding apparatus (1) comprising: an injection molding machine (500), a manifold (15) that receives an injection material (13) under pressure from the injection molding machine (500), a mold (25, 27, 300) having a cavity (5, 30) and at least one valve comprising: an actuator (14, 940, 941, 942) comprising a rotor (940r, 941r, 942r) controllably rotatable by electric power, the actuator (14, 940, 941, 942) being interconnected to a controller (16) that generates drive signals (DC), an electrical drive device (940d, 941d, 942d) comprising an interface that receives the drive signals (DC) and controllably distributes electrical energy or power in controllably varied amounts according to the drive signals (DC) to a driver (940dr, 941dr, 942dr) that drives the rotor (940r, 941r, 942r), a valve pin (1040, 1041, 1042) comprising a shaft having an axis (X) and a control surface (43, 45, 102m), the valve pin being interconnected at an upstream end to the rotor in an arrangement wherein the valve pin is controllably drivable along a linear path of travel (XX) upstream and downstream through a downstream feed channel (17, 19, 160, 940c, 941c, 942c) that routes the injection material to and through a gate (7, 9, 32, 34, 36) leading to the cavity of the mold, the downstream feed channel having a complementary surface (47, 103s) adapted to interface with the control surface (43, 45, 102m). the electrical drive (940d, 941d, 942d) comprising one or the other or both of a digital signal receiving (16r) and transmitting (16s) device, wherein: the digital signal receiving and transmitting device is adapted to receive (16r) and transmit (16s) digital signals between the electrical drive (940d, 941d, 942d) and the controller (16) of the injection molding apparatus (10); and wherein, the digital signals include the one or more control signals, where the one or more control signals are digital control signals received from the controller (16).

In such an apparatus, the downstream feed channel preferably has a complementary surface (47, 103s) adapted to interface with the control surface (43, 45, 102m) such that reactive upstream forces exerted on the valve pin (1040, 1041, 1042) are minimized.

In such an apparatus the downstream feed channel typically has a complementary surface (47, 103s) adapted to interface with the control surface (43, 45, 102m) at a position disposed upstream and away from the gate (32, 34, 36).

In such an apparatus the electrical drive (940d, 941d, 942d) can comprise one or the other or both of a digital signal receiving (16r) and transmitting (16s) device, wherein: the digital signal receiving and transmitting device is adapted to receive (16r) and transmit (16s) digital signals between the electrical drive (940d, 941d, 942d) and the controller (16) of the injection molding apparatus (10); and wherein, the digital signals include the one or more control signals, where the one or more control signals are digital control signals received from the controller (16).

Such an apparatus can include a position sensor (POS, POS0, POS1, POS2) that sends a position signal (POS0s, POS1s, POS2s) indicative of position of the valve pin (1040, 1041, 1042) to the controller (16), the program including instructions that utilize the position signal to instruct the actuator (14, 940, 941, 942) to move the valve pin (1040, 1041, 1042) to one or more predetermined positions during the course of an injection cycle.

In such an apparatus the actuator (940, 941, 942) and the controller (16) can be adapted to receive (16r) and transmit (16s) digital signals between the actuator and the controller (16), wherein the digital signals include one or more control signals received by the actuator (16r) from the controller (16).

In such an apparatus the downstream feed channel (17, 19, 160, 940c, 941c, 942c) can be adapted to deliver injection material to a further downstream channel (160, 942c2) having a channel axis (Y, Z) that is non coaxial relative to the linear path of travel (XX) of the valve pin.

In another aspect of the invention there is provided an injection molding apparatus (1) comprising: an injection molding machine (500), a manifold (15) that receives an injection material (13) under pressure from the injection molding machine (500), a mold (25, 27, 300) having a cavity (5, 30) and at least one valve comprising: an actuator (14, 940, 941, 942) comprising a rotor (940r, 941r, 942r) controllably rotatable by electric power, the actuator (14, 940, 941, 942) being interconnected to a controller (16) that generates drive signals (DC), an electrical drive device (940d, 941d, 942d) comprising an interface that receives the drive signals (DC) and controllably distributes electrical energy or power in controllably varied amounts according to the drive signals (DC) to a driver (940dr, 941dr, 942dr) that drives the rotor (940r, 941r, 942r), a valve pin (1040, 1041, 1042) comprising a shaft having an axis (X), the valve pin being interconnected at an upstream end (1041ue) to the rotor in an arrangement wherein the valve pin is controllably drivable by the actuator (14, 940, 941, 942) along a linear path of travel (XX) upstream and downstream through a downstream feed channel (940c, 941c, 942c), the valve pin and the downstream feed channel being adapted to interface with each other to vary rate or velocity of flow of the injection material to and through a gate (7, 9, 32, 34, 36) leading to the cavity of the mold, a pressure sensor (PS0, PS1, PS1a, PS2, PS2a) that senses pressure of the injection material within a channel (17, 19, 940c, 941c, 942c, 5011) upstream of the gate (7, 9, 32, 34, 36), a controller (16) including a program that receives signals from the pressure sensor (PS0, PS1, PS1a, PS2, PS2a) indicative of the sensed pressure, the program generating instructions based on the received signals that are sent to the actuator (14, 940, 941, 942) via the electrical drive device (940d, 941d, 942d), the instructions controlling interfacing of the valve pin and the downstream feed channel to control the rate or velocity of flow of the injection material during the course of an injection cycle, a position sensor (POS, POS0, POS1, POS2) that sends a position signal (POS0s, POS1s, POS2s) indicative of position of the valve pin (1040, 1041, 1042) to the controller (16), the program including instructions that utilize the position signal to instruct the actuator (14, 940, 941, 942) to move the valve pin (1040, 1041, 1042) to one or more predetermined positions during the course of an injection cycle.

In such an apparatus, the downstream feed channel preferably has a complementary surface (47, 103s) adapted to interface with the control surface (43, 45, 102*m*) such that reactive upstream forces exerted on the valve pin (1040, 1041, 1042) are minimized.

In such an apparatus the downstream feed channel typically has a complementary surface (47, 103*s*) adapted to interface with the control surface (43, 45, 102*m*) at a position disposed upstream and away from the gate (32, 34, 36).

In such an apparatus the electrical drive (940*d*, 941*d*, 942*d*) can comprise one or the other or both of a digital signal receiving (16*r*) and transmitting (16*s*) device, wherein: the digital signal receiving and transmitting device is adapted to receive (16*r*) and transmit (16*s*) digital signals between the electrical drive (940*d*, 941*d*, 942*d*) and the controller (16) of the injection molding apparatus (10); and wherein, the digital signals include the one or more control signals, where the one or more control signals are digital control signals received from the controller (16).

Such an apparatus can include a position sensor (POS, POS0, POS1, POS2) that sends a position signal (POS0*s*, POS1*s*, POS2*s*) indicative of position of the valve pin (1040, 1041, 1042) to the controller (16), the program including instructions that utilize the position signal to instruct the actuator (14, 940, 941, 942) to move the valve pin (1040, 1041, 1042) to one or more predetermined positions during the course of an injection cycle.

In such an apparatus the actuator (940, 941, 942) and the controller (16) can be adapted to receive (16*r*) and transmit (16*s*) digital signals between the actuator and the controller (16), wherein the digital signals include one or more control signals received by the actuator (16*r*) from the controller (16).

In such an apparatus the downstream feed channel (17, 19, 160, 940*c*, 941*c*, 942*c*) can be adapted to deliver injection material to a further downstream channel (160, 942*c*2) having a channel axis (Y, Z) that is non coaxial relative to the linear path of travel (XX) of the valve pin In another aspect of the invention there is provided an injection molding apparatus (1) comprising: an injection molding machine (500), a manifold (15) that receives an injection material (13) under pressure from the injection molding machine (500), a mold (25, 27, 300) having a cavity (5, 30) and at least one valve comprising: an actuator (14, 940, 941, 942) comprising a rotor (940*r*, 941*r*, 942*r*) controllably rotatable by electric power, the actuator (14, 940, 941, 942) being interconnected to a controller (16) that generates drive signals (DC), valve pin (1040, 1041, 1042) comprising a shaft having an axis (X) and a control surface (43, 45, 102*m*), the valve pin being interconnected at an upstream end to the rotor in an arrangement wherein the valve pin is controllably drivable along a linear path of travel (XX) upstream and downstream through a downstream feed channel (17, 19, 160, 940*c*, 941*c*, 942*c*) that routes the injection material to and through a gate (7, 9, 32, 34, 36) leading to the cavity of the mold, the downstream feed channel having a complementary surface (47, 103*s*) adapted to interface with the control surface (43, 45, 102*m*), the drive signals instructing the rotor (940*r*, 941*r*, 942*r*) to controllably drive the control surface (43, 45, 102*m*) to one or more positions relative to the complementary surface (47, 103*s*) such that rate or velocity of flow of the injection material is controllably variable, the actuator (940, 941, 942) and the controller (16) being adapted to receive (16*r*) and transmit (16*s*) digital signals between the actuator and the controller (16), wherein the digital signals include one or more control signals received by the actuator (16*r*) from the controller (16).

In such an apparatus, the downstream feed channel preferably has a complementary surface (47, 103*s*) adapted to interface with the control surface (43, 45, 102*m*) such that reactive upstream forces exerted on the valve pin (1040, 1041, 1042) are minimized.

In such an apparatus the downstream feed channel typically has a complementary surface (47, 103*s*) adapted to interface with the control surface (43, 45, 102*m*) at a position disposed upstream and away from the gate (32, 34, 36).

In such an apparatus the electrical drive (940*d*, 941*d*, 942*d*) can comprise one or the other or both of a digital signal receiving (16*r*) and transmitting (16*s*) device, wherein: the digital signal receiving and transmitting device is adapted to receive (16*r*) and transmit (16*s*) digital signals between the electrical drive (940*d*, 941*d*, 942*d*) and the controller (16) of the injection molding apparatus (10); and wherein, the digital signals include the one or more control signals, where the one or more control signals are digital control signals received from the controller (16).

Such an apparatus can include a position sensor (POS, POS0, POS1, POS2) that sends a position signal (POS0*s*, POS1*s*, POS2*s*) indicative of position of the valve pin (1040, 1041, 1042) to the controller (16), the program including instructions that utilize the position signal to instruct the actuator (14, 940, 941, 942) to move the valve pin (1040, 1041, 1042) to one or more predetermined positions during the course of an injection cycle.

In such an apparatus the actuator (940, 941, 942) and the controller (16) can be adapted to receive (16*r*) and transmit (16*s*) digital signals between the actuator and the controller (16), wherein the digital signals include one or more control signals received by the actuator (16*r*) from the controller (16).

In such an apparatus the downstream feed channel (17, 19, 160, 940*c*, 941*c*, 942*c*) can be adapted to deliver injection material to a further downstream channel (160, 942*c*2) having a channel axis (Y, Z) that is non coaxial relative to the linear path of travel (XX) of the valve pin In another aspect of the invention there is provided an injection molding apparatus (1) comprising: an injection molding machine (500), a manifold (15) that receives an injection material (13) under pressure from the injection molding machine (500), a mold (25, 27, 300) having a cavity (5, 30) and at least one valve comprising: an actuator (14, 940, 941, 942) comprising a rotor (940*r*, 941*r*, 942*r*) controllably rotatable by electric power, the actuator (14, 940, 941, 942) being interconnected to a controller (16) that generates drive signals (DC), a valve pin (1040, 1041, 1042) comprising a shaft having an axis (X) and a control surface (43, 45, 102*m*), the valve pin being interconnected at an upstream end to the rotor in an arrangement wherein the valve pin is controllably drivable along a linear path of travel (XX) upstream and downstream through a downstream feed channel (17, 19, 160, 940*c*, 941*c*, 942*c*) that routes the injection material to and through a gate (7, 9, 32, 34, 36) leading to the cavity of the mold, the downstream feed channel having a complementary surface (47, 103*s*) adapted to interface with the control surface (43, 45, 102*m*), the drive signals instructing the rotor (940*r*, 941*r*, 942*r*) to controllably drive the control surface (43, 45, 102*m*) to one or more positions relative to the complementary surface (47, 103*s*) such that rate or velocity of flow of the injection material is controllably variable, the downstream feed channel (17, 19, 160, 940*c*, 941*c*, 942*c*) delivering injection material to a further downstream channel (160, 942*c*2) having a channel axis (Y, Z) that is non coaxial relative to the linear path of travel (XX) of the valve pin.

In such an apparatus, the downstream feed channel preferably has a complementary surface (47, 103s) adapted to interface with the control surface (43, 45, 102m) such that reactive upstream forces exerted on the valve pin (1040, 1041, 1042) are minimized.

In such an apparatus the downstream feed channel typically has a complementary surface (47, 103s) adapted to interface with the control surface (43, 45, 102m) at a position disposed upstream and away from the gate (32, 34, 36).

In such an apparatus the electrical drive (940d, 941d, 942d) can comprise one or the other or both of a digital signal receiving (16r) and transmitting (16s) device, wherein: the digital signal receiving and transmitting device is adapted to receive (16r) and transmit (16s) digital signals between the electrical drive (940d, 941d, 942d) and the controller (16) of the injection molding apparatus (10); and wherein, the digital signals include the one or more control signals, where the one or more control signals are digital control signals received from the controller (16).

Such an apparatus can include a position sensor (POS, POS0, POS1, POS2) that sends a position signal (POS0s, POS1s, POS2s) indicative of position of the valve pin (1040, 1041, 1042) to the controller (16), the program including instructions that utilize the position signal to instruct the actuator (14, 940, 941, 942) to move the valve pin (1040, 1041, 1042) to one or more predetermined positions during the course of an injection cycle.

In such an apparatus the actuator (940, 941, 942) and the controller (16) can be adapted to receive (16r) and transmit (16s) digital signals between the actuator and the controller (16), wherein the digital signals include one or more control signals received by the actuator (16r) from the controller (16).

In such an apparatus the downstream feed channel (17, 19, 160, 940c, 941c, 942c) can be adapted to deliver injection material to a further downstream channel (160, 942c2) having a channel axis (Y, Z) that is non coaxial relative to the linear path of travel (XX) of the valve pin.

In another aspect of the invention there is provided a method of performing an injection molding cycle comprising operating any of the apparatuses described herein.

In another aspect of the invention there is provided an injection molding apparatus (1) comprising: an injection molding machine (500), a manifold (15) that receives an injection material (18) under pressure from the injection molding machine (500), a mold (25, 27, 300) having a cavity (5, 30) and at least one valve comprising:

an actuator (14, 940, 941, 942) comprising a driver (940dr, 941dr, 942dr), the actuator (14, 940, 941, 942) being interconnected to a controller (16) that generates drive signals (DC), an electrical drive device (940d, 941d, 942d) comprising an interface that receives the drive signals (DC) and controllably distributes electrical energy or power in controllably varied amounts according to the drive signals (DC) to the driver (940dr, 941dr, 942dr) that drives the rotor (940r, 941r, 942r), a valve pin (1040, 1041, 1042) comprising a shaft having an axis (X) and a control surface (43, 45, 102m) disposed at a selected position along the axis (X) of the shaft, the valve pin being interconnected to the driver (940dr, 941dr, 942dr) in an arrangement wherein the valve pin is controllably drivable along a linear path of travel (XX) upstream and downstream through a downstream feed channel (17, 19, 160, 940c, 941c, 942c) that routes the injection material to and through a gate (7, 9, 32, 34, 36) leading to the cavity of the mold, the downstream feed channel having a complementary surface (47, 103s) adapted to interface with the control surface (43, 45, 102m) upstream and away from the gate (7, 9, 32, 34, 36) to controllably vary rate or velocity of flow according to controlled axial positioning of the control surface (43, 45, 102m) relative to the complementary surface (47, 103s) of the downstream feed channel (17, 19, 160, 940c, 941c, 942c).

the valve pin being translationally drivable at a controllable rate of travel between a start or fluid stop flow position, one or more intermediate flow rate positions and a high flow rate position, the valve pin being driven to the one or more intermediate flow rate positions after withdrawal from the gate closed position to a second position and subsequently driven to a high flow rate position;

the apparatus including a position sensor adapted to sense the position of the valve pin and send a signal indicative of the position of the pin to the controller;

the controller including instructions that instruct the driver to drive the valve pin from the start or fluid stop position to the second position and subsequently to the high flow rate position on receipt by the controller of a signal from the position sensor that is indicative of the valve pin having reached the second position.

BRIEF DESCRIPTION OF THE DRAWINGS

The accompanying drawings contain numbering of components and devices that correspond to the numbering appearing in the foregoing Summary and following description.

FIG. 8A is a schematic side sectional view of the armature and drive rod components of a linear drive proportional solenoid that can be substituted for the assembly of rotary motion enabling components of the rotary electric actuators described herein to enable direct linear actuation movement of the drive rod by the armature when energized with electricity.

FIG. 9A is a schematic side sectional view of the armature and drive rod components of a linear motor that can be substituted for the assembly of rotary motion enabling components of the rotary electric actuators described herein to enable direct linear actuation movement of the drive rod by the armature when energized with electricity.

FIG. 11b is another example of a profile similar to FIG. 11a.

FIG. 11c is another example of a profile similar to FIG. 11a.

FIG. 11d is another example of a profile similar to FIG. 11a.

DETAILED DESCRIPTION

Figure 1:
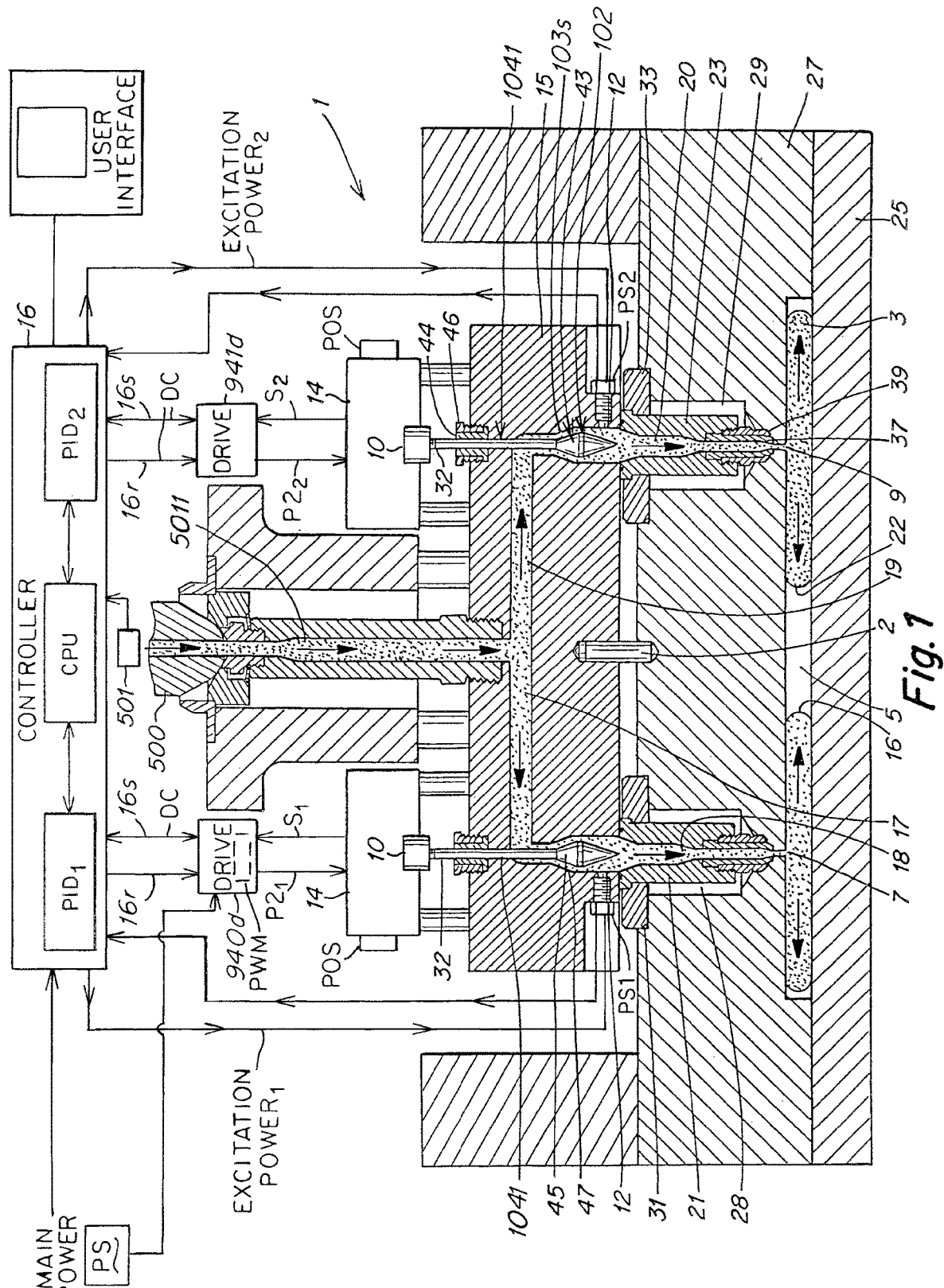
FIG. 1 is a schematic cross section of an injection molding system comprised of an electric or electronic actuator interconnected to a shortened valve pin without a downstream gate closing needle portion, the distal end of the shortened valve pin having a bulbous portion or protrusion that has a flow control surface that interfaces with a complementary control surface of a flow channel along a selected position upstream of and away from the gate to control the rate of flow of injection fluid upstream of the gate during the course of an injection molding cycle, the electric or electronic actuators being interconnected to an electronic drive control device that is mounted to the housing of the electric or electronic actuator, the electronic drive control device receiving digital control and other signals from a remotely mounted controller containing a program that executes an algorithm for controlling operation of the electric or electronic actuator and the position of the valve pin within the flow channel during the course of an injection cycle.

FIG. 1 is a schematic cross section of an injection molding system comprised of an electric or electronic actuator interconnected to a valve pin that has a flow control surface that interfaces with a surface of a flow channel at a selected position upstream of and away from the gate to control the rate of flow of injection fluid upstream of the gate during the course of an injection molding cycle, the electric or electronic actuators being interconnected to an electronic drive control device that is mounted to the housing of the electric or electronic actuator, the electronic drive control device receiving digital control and other signals from a remotely mounted controller containing a program that executes an algorithm for controlling operation of the electric or electronic actuator and the position of the valve pin within the flow channel during the course of an injection cycle.

Figure 2:
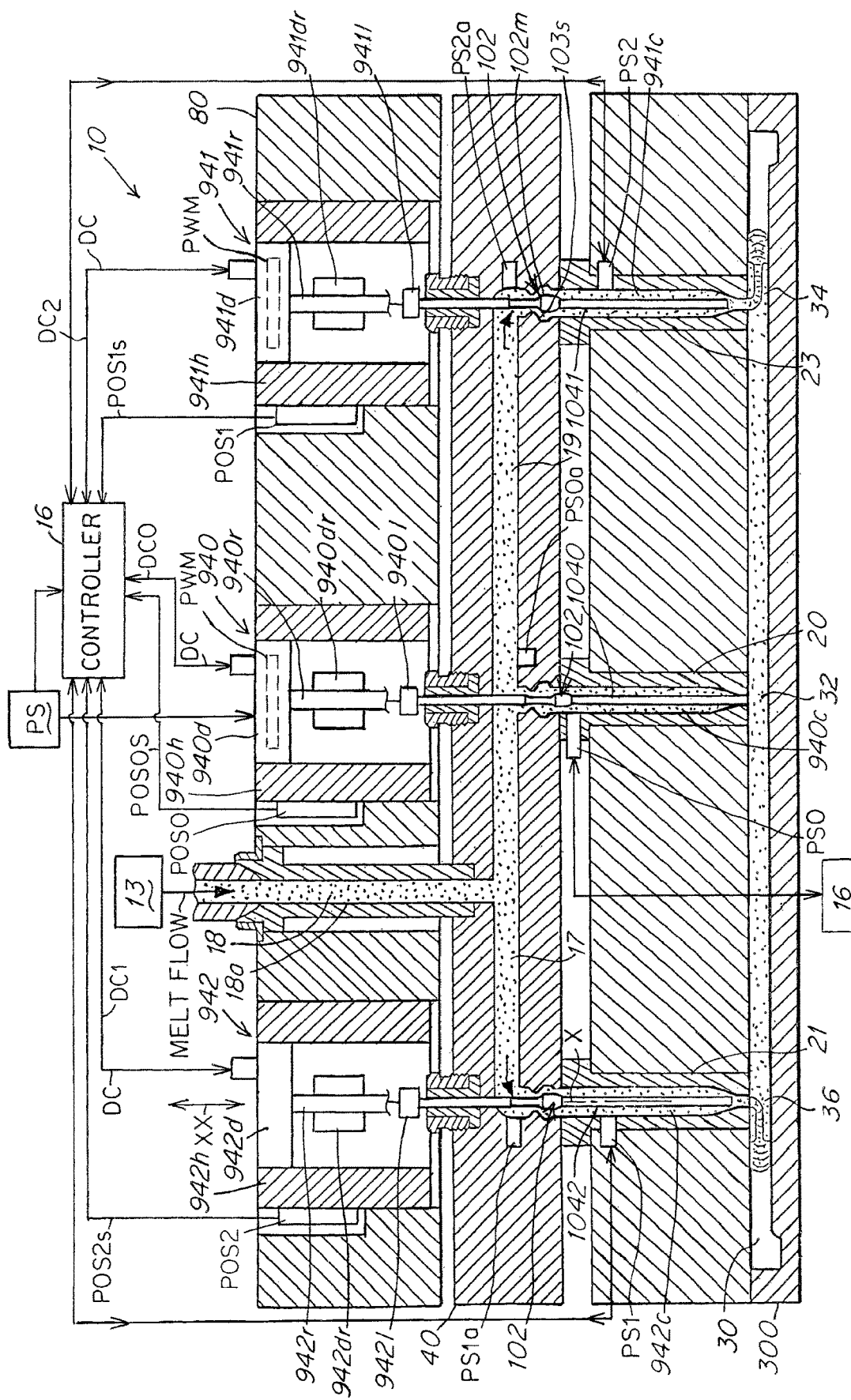
FIG. 2 is a side sectional schematic of a sequential valve gated system similar to the FIG. 1 system showing three valves with extended pins and that have electric or electronic actuators that have a drive control mechanism that is integrated together with the body or housing of the actuator that houses the rotor and rotor drive components of the actuator.

FIG. 2 shows a sequential valve gated system showing three valves that have electric or electronic actuators that have a drive control mechanism that is integrated together with the body or housing of the actuator that houses the rotor and rotor drive components of the actuator.

FIGS. 1, 2 show exemplary embodiments of injection molding systems according to the present invention. The systems shown are multi-gate single cavity systems in which melt material 18 is injected into a cavity 5, 30 from gates 32, 34, 36. Melt material 18 is injected from the barrel 500 of an injection molding machine 13 through an extended inlet 5011 and into a heated distribution manifold 15, 40. Manifold 15, 40 distributes the melt through upstream channels 17, 19. Although a hot runner system is shown in which plastic melt is injected, the invention is applicable to other types of injection systems in which it is useful to control the rate at which a material (e.g., metallic or composite materials) is delivered to a cavity. Melt is distributed through channels 17, 19 and into bores 940c, 941c, 942c of nozzles 20, 21, 23 respectively. Melt is injected out of nozzles 20, 21, 23 and into cavities 5, 30 (where the part is formed) which is formed by mold plates 25, 27, 300. Although a multi-gate single-cavity system is shown, the invention is applicable to, for example, multi-cavity systems.

The injection nozzles 20, 21, 23 are received in respective wells formed in the mold plates. The nozzles are typically each seated in support rings that serve to align the nozzles with the gates 32, 34, 36 and insulate the nozzles from the mold. An upstream end 1041ue of the valve pins 1040, 1041, 1042 is connected to an associated actuator 14, 940, 941, 942 that operate to drive the valve pins reciprocally upstream and downstream through the delivery channels 940c, 941c, 942c. The valve pin is opened at the beginning of the injection cycle starting from a fully closed position as shown for example in FIGS. 3, 3B and returned to a fully closed at the end of the cycle. During the cycle, the valve pin can assume intermediate positions between an upstream open position, in order to decrease or increase the rate of flow of the melt. In the embodiments shown, a protrusion or head 102 is disposed between an upstream end 1041ue and downstream end 1041de. The protrusion includes a tapered portion 102m that forms an adjustably variable gap CGu, CGd with a surface 103s, 103s2 of the bore of the delivery channel of the manifold. Increasing or decreasing the size of the gap by displacing the valve pin correspondingly increases or decreases the flow of melt material to the gate. The valve pins 1040, 1041, 1042 can close and stop flow of injection fluid 18 in both a select upstream position as shown for example in FIGS. 5, 5A and in a fully downstream gate closed position as shown for example in FIGS. 3, 3B. When the valve pin 1040, 1041, 1042 is closed in a downstream position, in the embodiment shown in FIGS. 3, 3B the downstream end 1041de can be configured as a tapered portion as shown that contacts and seals with a complementary tapered gate surface GS. In alternative embodiments the gate surface can be configured in a cylindrical or other configuration to mate with a complementarily cylindrically configured distal end surface 1041de of a valve pin 940c, 941c, 942c.

Melt flow rate is related to the material pressure sensed in a flow channel. Thus, using the controller 16, the rate at which the melt flows through the gates 32, 34, 36 and into the cavities can be controllably adjusted during a given injection molding cycle, according to a predetermined desired pressure profile.

Figure 3:
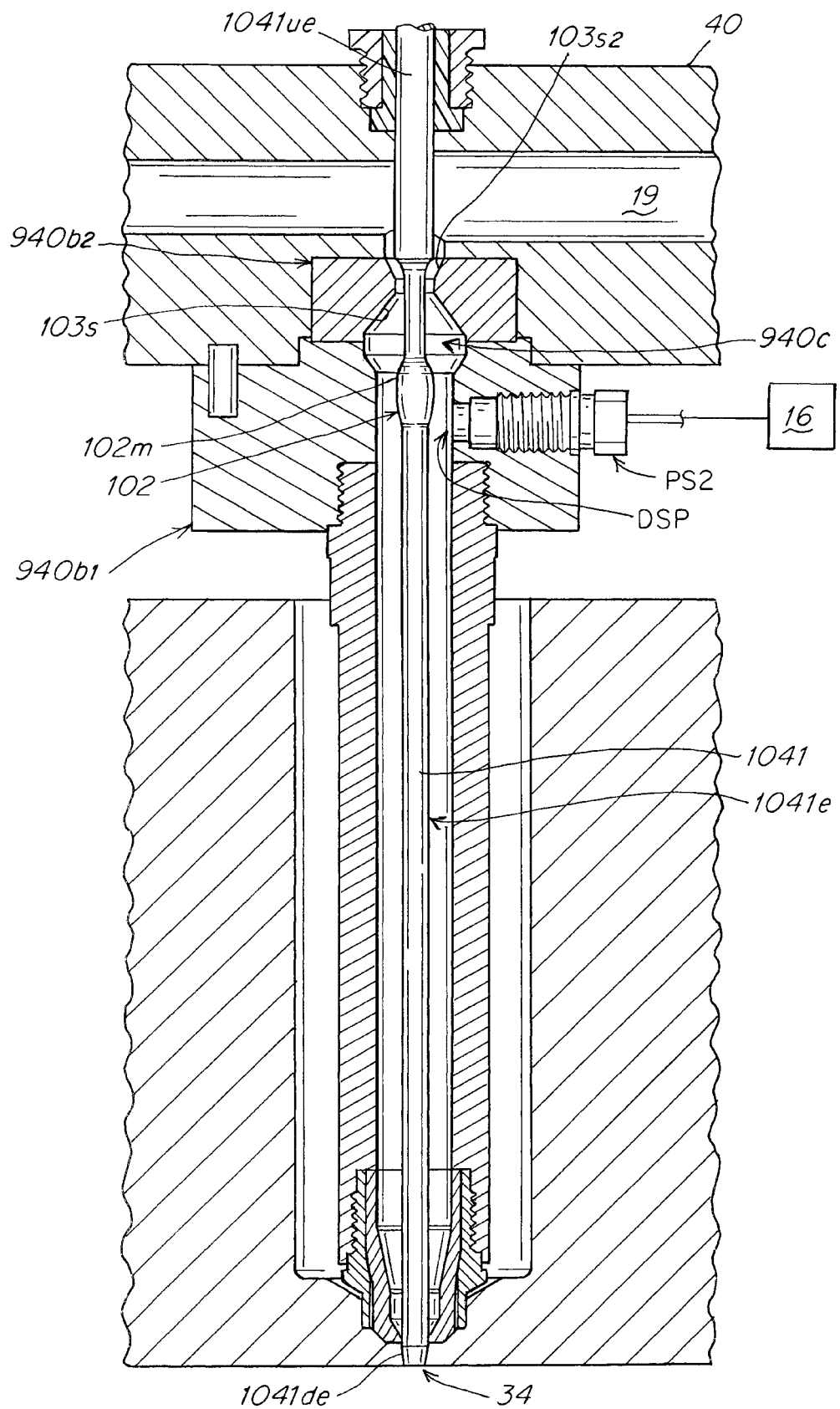
FIG. 3 is a cross sectional view of one example of a valve pin assembly, the valve pin having an upstream protrusion having a control surface 102m that interfaces with a complementary inside surface 103s of the downstream flow channel that leads to the gate of the cavity, the upstream control surface of the pin being disposed in a flow open position with respect to the complementary inside channel surface. And, in the position shown in FIG. 3, the downstream needle or shaft extension 1041e of the pin 1041 is disposed in a gate closed or injection material stopped position.
Figure 3A:
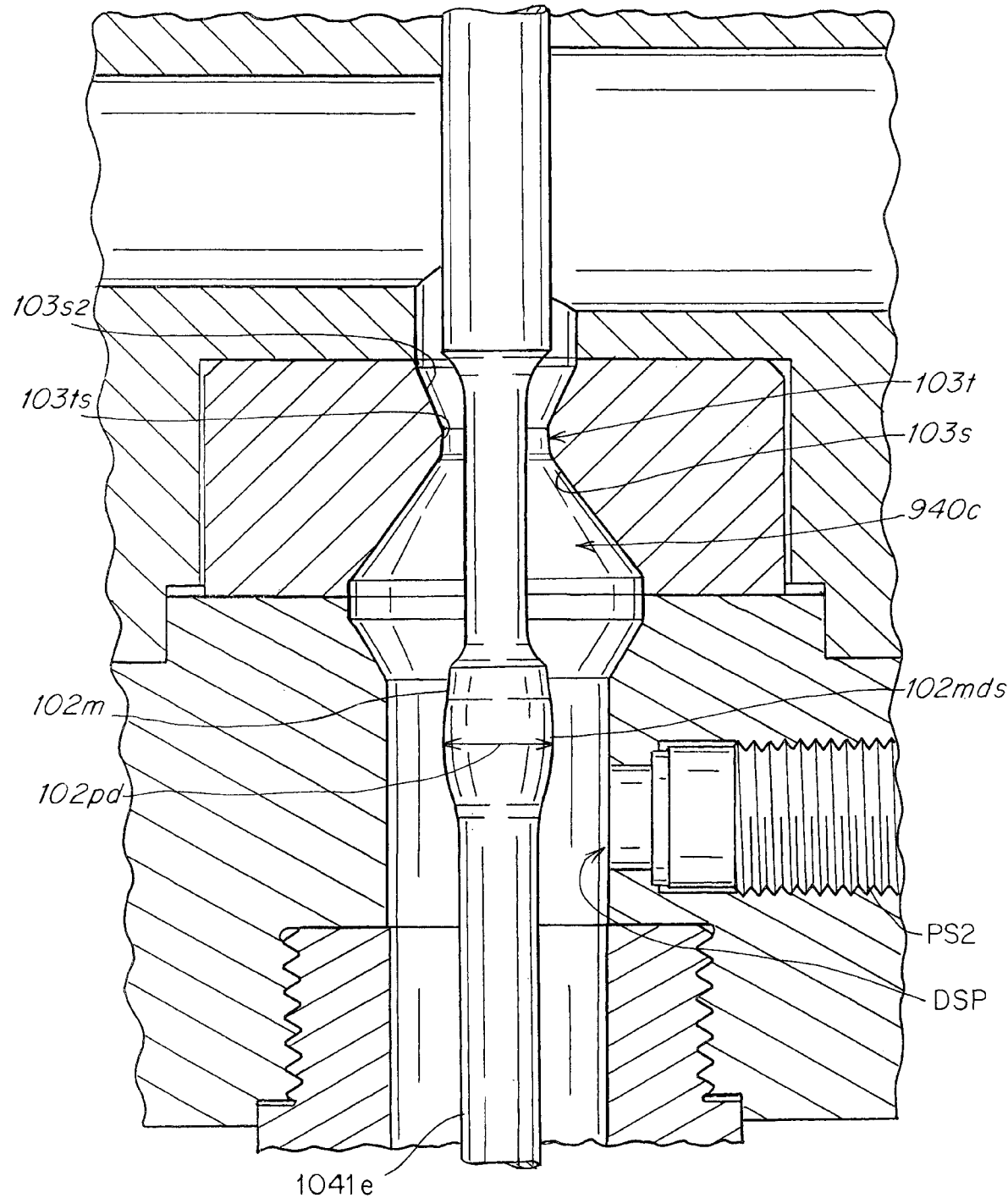
FIG. 3A is a closeup sectional view of the throat, control surface 102m and complementary channel surface 103s elements of the FIG. 3 subassembly.
Figure 3B:
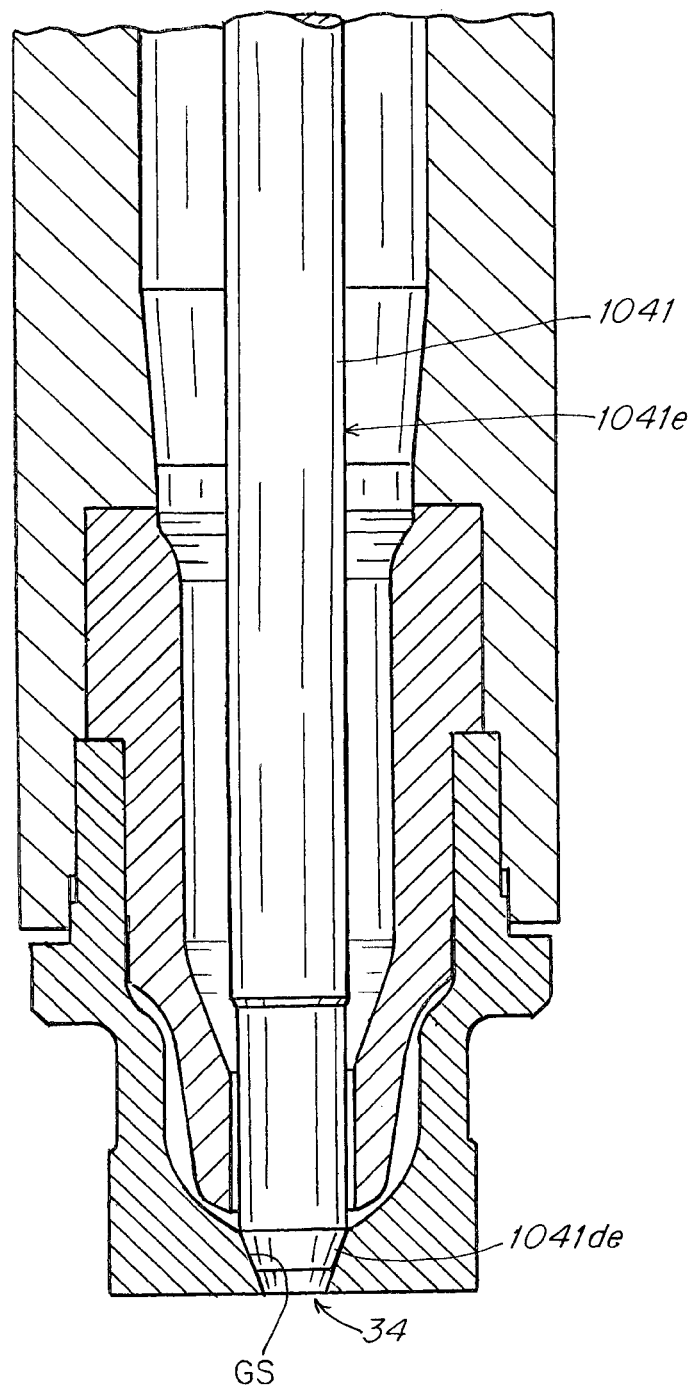
FIG. 3B is a is closeup sectional view of the distal valve and nozzle or gate ends of the FIG. 3 subassembly.
Figure 4:
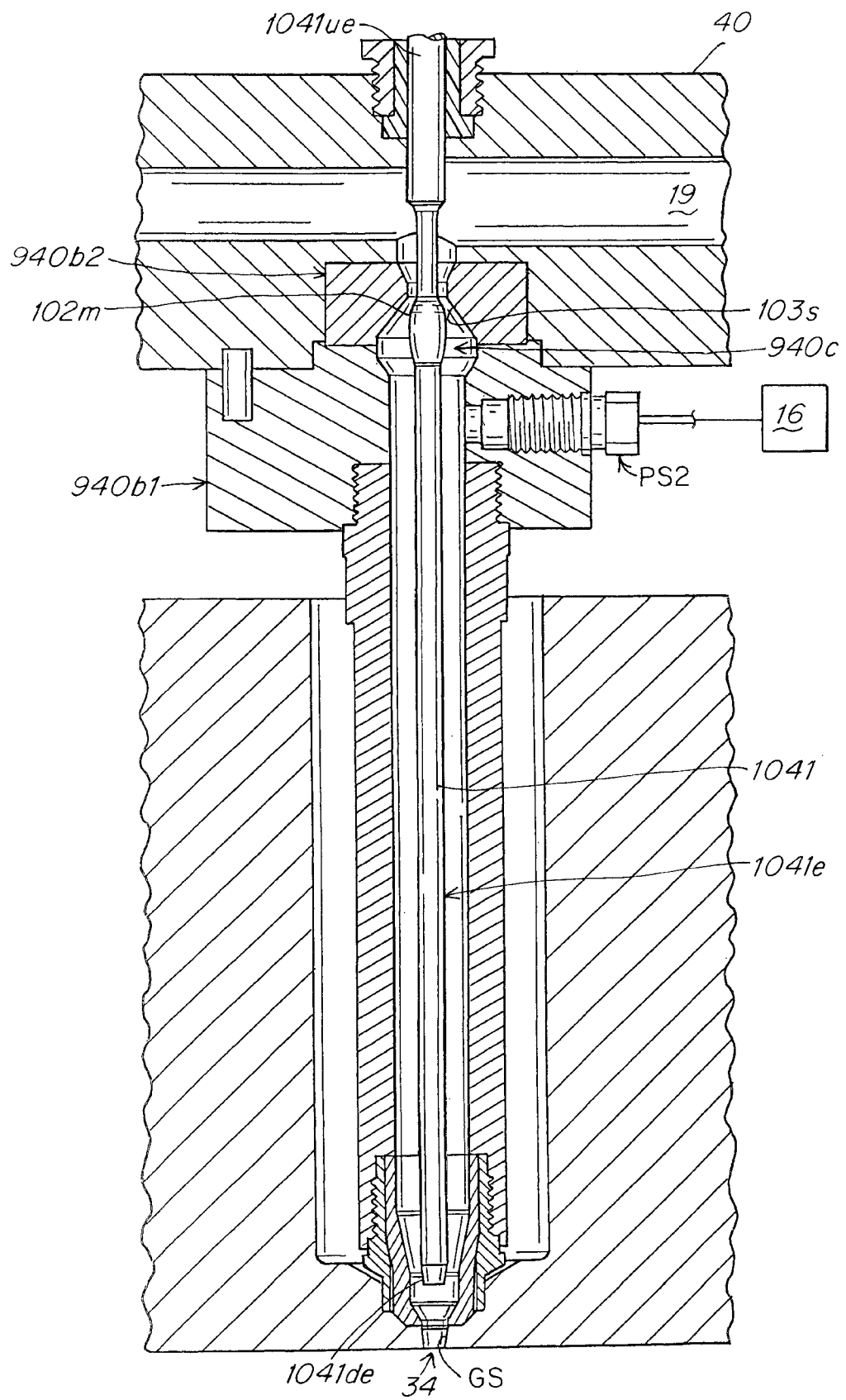
FIG. 4 is a view similar to FIG. 3 showing the valve pin component disposed in an intermediate upstream position relative to the position shown in FIG. 3 where the rate of flow of injection material is restricted by interfacing or interaction of the control surface 102m and complementary surface 103s and flow is enabled at the gate area 34 with the tip end of the valve pin being withdrawn upstream from the gate surface GS.
Figure 4A:
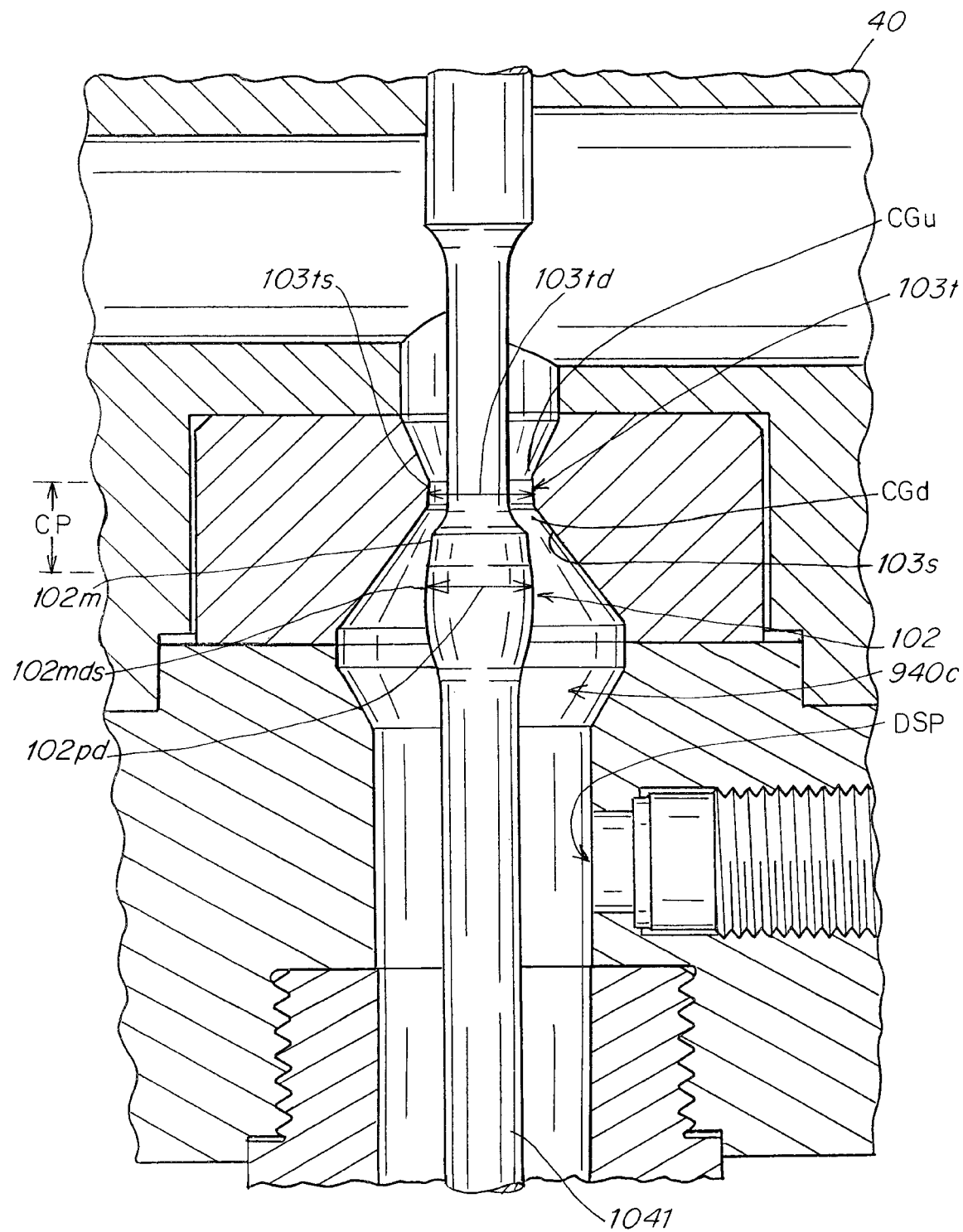
FIG. 4A is a closeup sectional view of the throat, control surface 102m and complementary channel surface 103s elements of the FIG. 4 subassembly view.
Figure 4B:
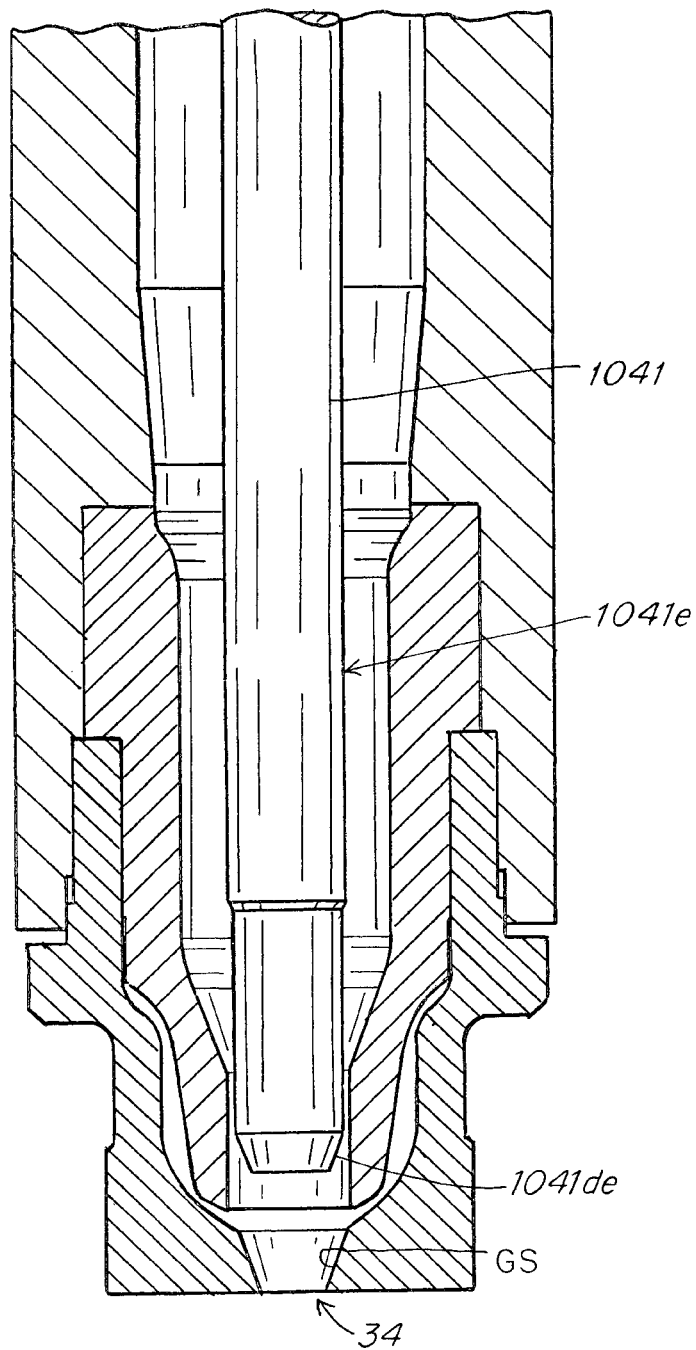
FIG. 4B is a is closeup sectional view of the distal valve and nozzle or gate ends of the FIG. 4 view and subassembly.
Figure 5:
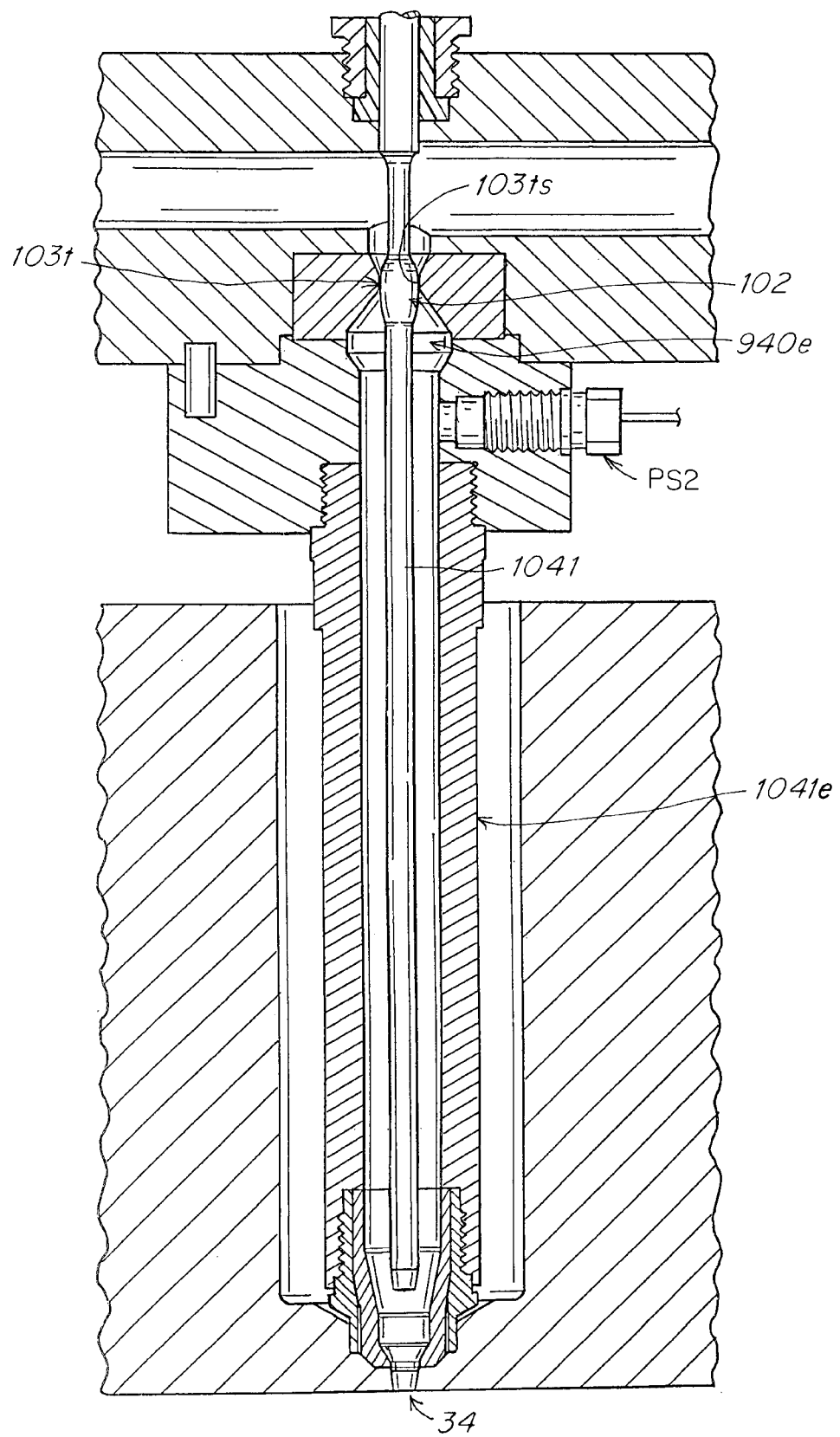
FIG. 5 is a view similar to FIG. 3 showing the valve pin component disposed in a throat closed position relative to the position shown in FIG. 3 where the rate of flow of injection material is stopped by mating of the maximum diameter portion or circumference of the control surface 102m and the complementary inside circumferential surface 103s, and such that flow is enabled at the gate area 34 with the tip end of the valve pin being withdrawn even further upstream from the gate surface GS.
Figure 5A:
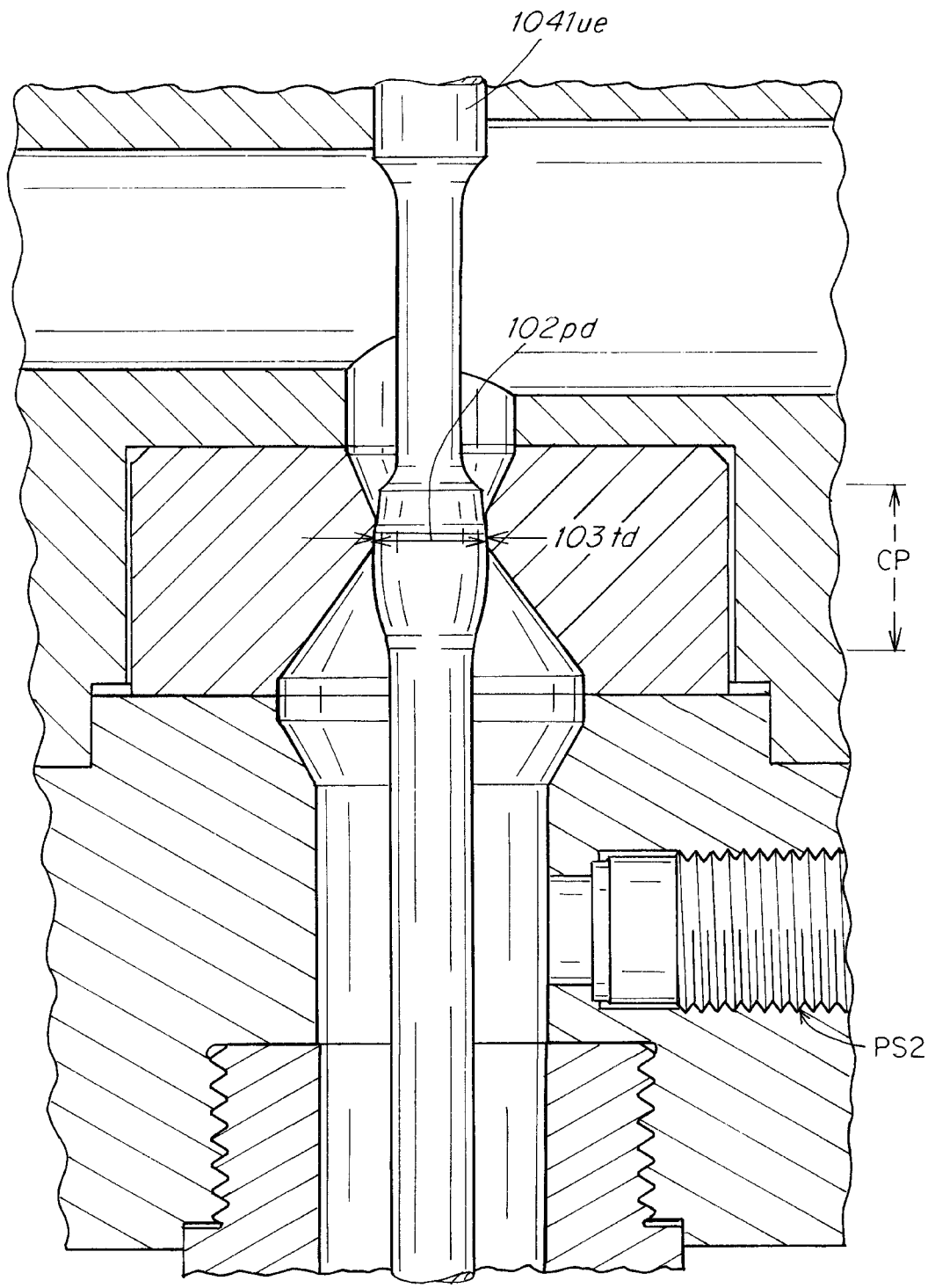
FIG. 5A is an enlarged fragmentary sectional view of the throat, control surface 102m and complementary channel surface 103s elements of the FIG. 5 subassembly.

In one embodiment, FIGS. 3, 3A, 3B, 4, 4A, 4B, 5, 5A, 5B, to reduce the rate or velocity of flow of melt 18, the pin 1041 can be retracted or controllably driven upstream away from the gate along a selected portion of a selected flow control path of travel CP as shown for example in FIGS. 4A, 5A by an actuator 940, 941, 942 to thereby controllably decrease the width of a flow control gap CGd between the control surface 102m of the valve pin and the complementary control surface 103s of the bore of the downstream channel 940c, 941c, 942c. In this same embodiment the rate or velocity of flow of melt 18 can be controllably variably increased by controllably driving the valve pin downstream along the selected portion of a selected flow control path of travel CP.

In an alternative embodiment, the rate or velocity of flow of melt 18 can conversely be controllably increased by controllably driving the valve pin 1041, FIGS. 3, 3A, 3B, 4, 4A, 4B, 5, 5A, 5B, upstream away from the gate along another selected portion of a selected flow control path of travel beginning at and extending upstream of the throat 103t to controllably increase the width of a flow control gap CGu between the control surface 102m of the valve pin and another complementary control surface of the bore of the downstream channel 940c, 941c, 942c. In this alternative embodiment the rate or velocity of flow of melt 18 can be controllably variably decreased by controllably driving the valve pin downstream along the same alternative selected portion of a selected flow control path of travel.

Figure 5B:
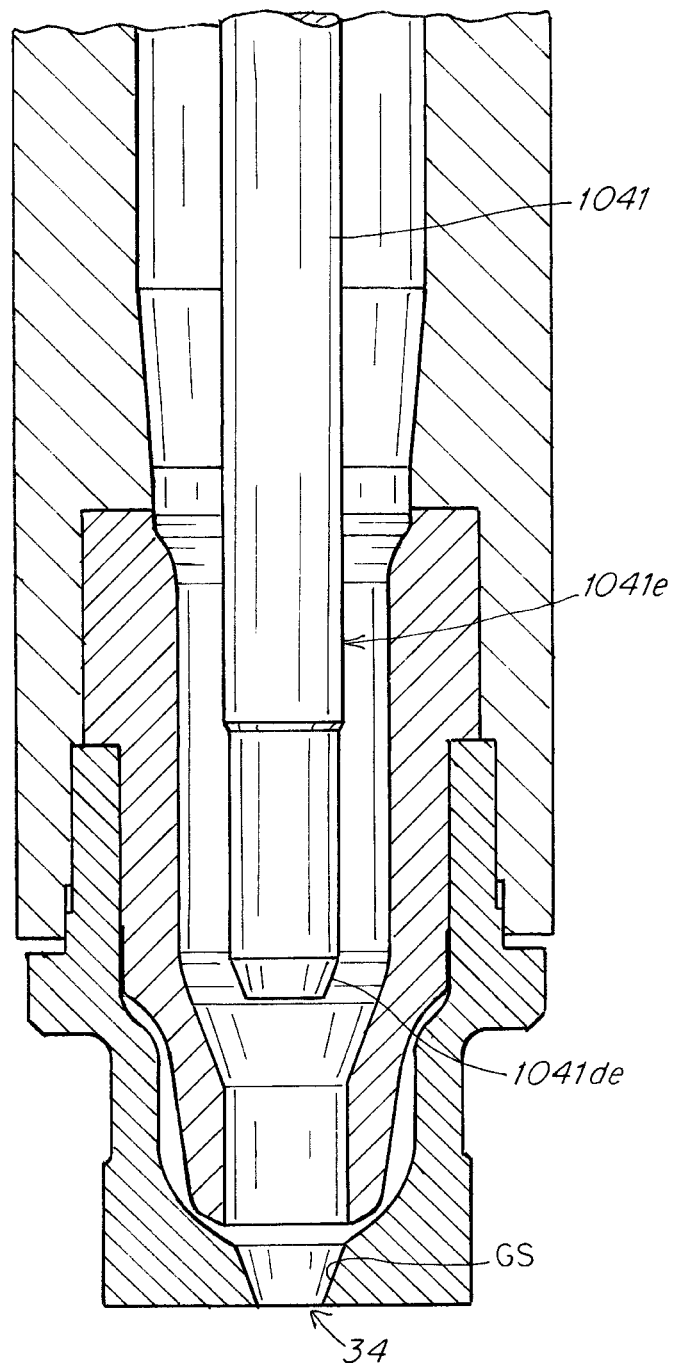
FIG. 5B is a is enlarged fragmentary sectional view of the distal valve and nozzle or gate ends of the FIG. 5 subassembly.

In the FIGS. 3-5B embodiments, the valve pin includes an extension (1041) extending downstream from the control surface (43, 45, 102m), the valve pin (1040, 1041, 1042) and the downstream feed channel (17, 19, 160, 940c, 941c, 942c) being configured such that in a first downstream position a distal end (1041de) of the valve pin closes the gate (32, 34, 36) and the interface between the control surface (43, 45, 102m) and the complementary surface (47, 103s) is not closed as shown in FIGS. 3-3B, and in a second upstream position, the distal end of the valve pin (1041de) does not close the gate (32, 34, 36) and the interface between the control surface (43, 45, 102m) and the complementary surface (47, 103s) is closed as shown in FIG. 5-5B.

A material pressure transducer or sensor PS1, PS2, PS1a, PS2a can be used to sense the pressure of the injection material 18 either in the delivery channel 940c, 941c, 942c or within a fluid flow channel 17, 19 disposed within the manifold 40 or within a bushing 940b1, 940b2 having a fluid delivery channel that communicates with the downstream fluid delivery channel 940c, 941c, 942c.

In operation, the material 18 pressure is sensed by a pressure sensor PS0, PS0a, PS1, PS2, PS1a, PS2a associated with each nozzle and is communicated in real time to a control system or controller 16. The controller 16 receives the pressure signals, compares them to a predetermined profile of pressures over the course of an injection cycle and sends drive signals DC to the electrical drives 940d, 941d, 942d that controllably distributes electrical energy or power in controllably varied amounts according to the drive signals (DC) to the drivers 940dr, 941dr, 942dr that drive the rotors of the electric actuators. The controller includes a processor and instructions that generate drive signals DC that result in the valve pin 1040, 1041, 1042 being driven upstream or downstream within a fluid delivery channel 940c, 941c, 942c to select positions during the course of an injection cycle so as to cause the pressure of the material 18 as measured in real time by the sensors PS0, PS1, PS2 to be adjusted to match or track the predetermined profile of preferred cycle material pressures such as in the examples described with reference to FIGS. 11-13.

Figure 5C:
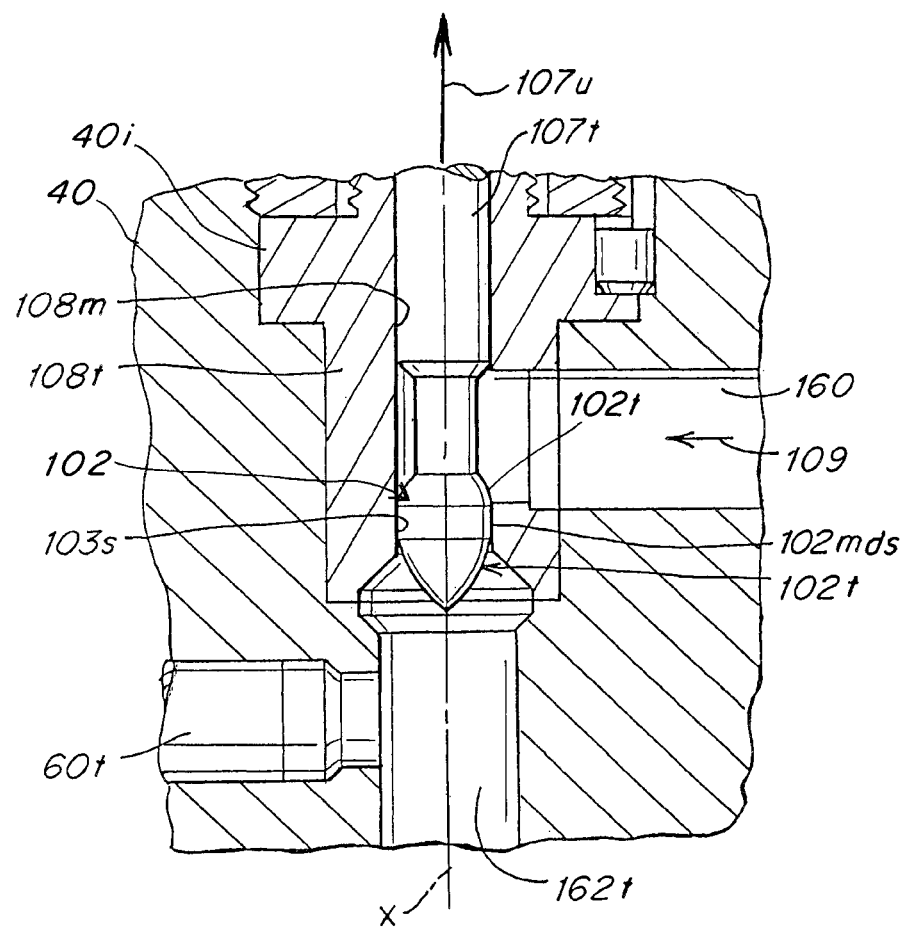
FIG. 5C is an enlarged fragmentary sectional view of a portion of an elbowed flow channel formed by the mating of a bore in an insert or bushing 40i and a flow channel formed within a heated manifold 40. In this embodiment a valve pin 107t is provided having a bulb or control member 102 having a control surface 102t and a maximum diameter section having an outer circumferential surface 102mds that mates with an inside complementary surface 103s of the flow channel. In the FIG. 5C view, the valve pin is disposed in an axial position where the maximum diameter circumferential surface 102mds is aligned and mated with the complementary surface such that flow of injection material is stopped.
Figure 5D:
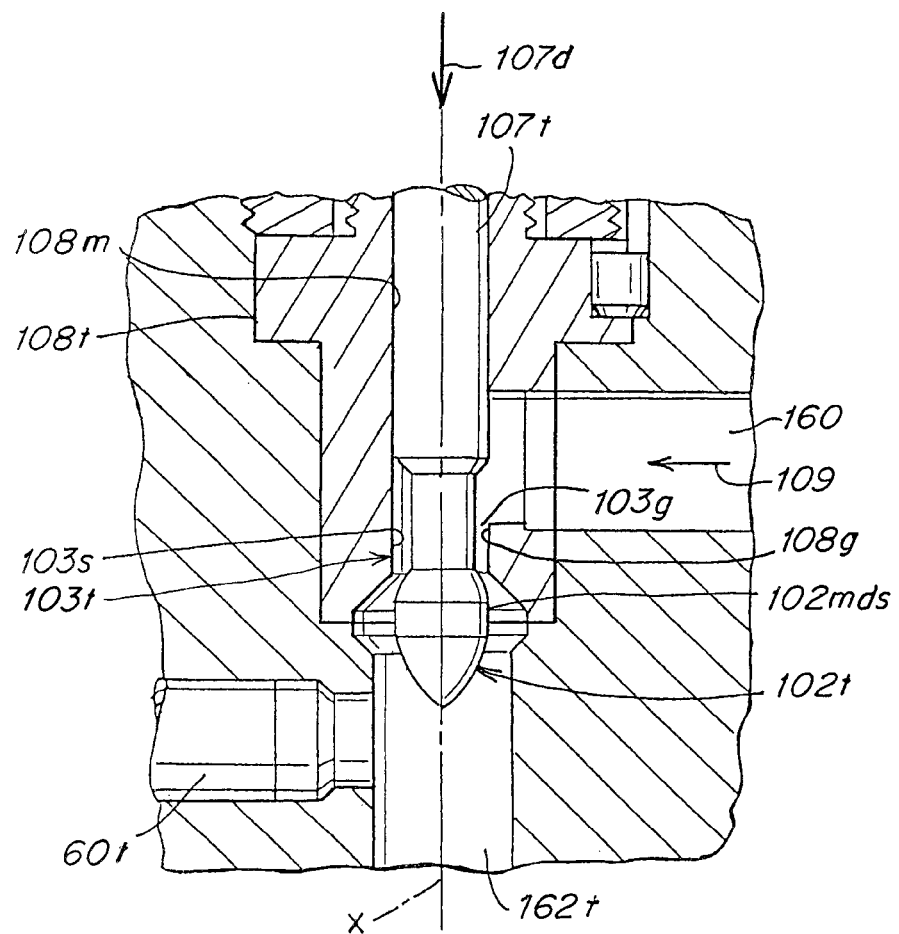
FIG. 5D is a view similar to FIG. 5C showing the valve pin disposed downstream of the throat section 103t relative to the FIG. 5C position in an axial position where the control surface 102t of the pin is disposed in an axial position where a gap 102g is formed that restricts flow to less than a maximum flow rate that occurs when the protrusion 102 is moved fully downstream of the throat where flow is not restricted. Flow rate can be controllably varied by moving the valve pin downstream from the FIG. 5C position through a select range of downstream travel relative to the throat 103t.
Figure 5E:
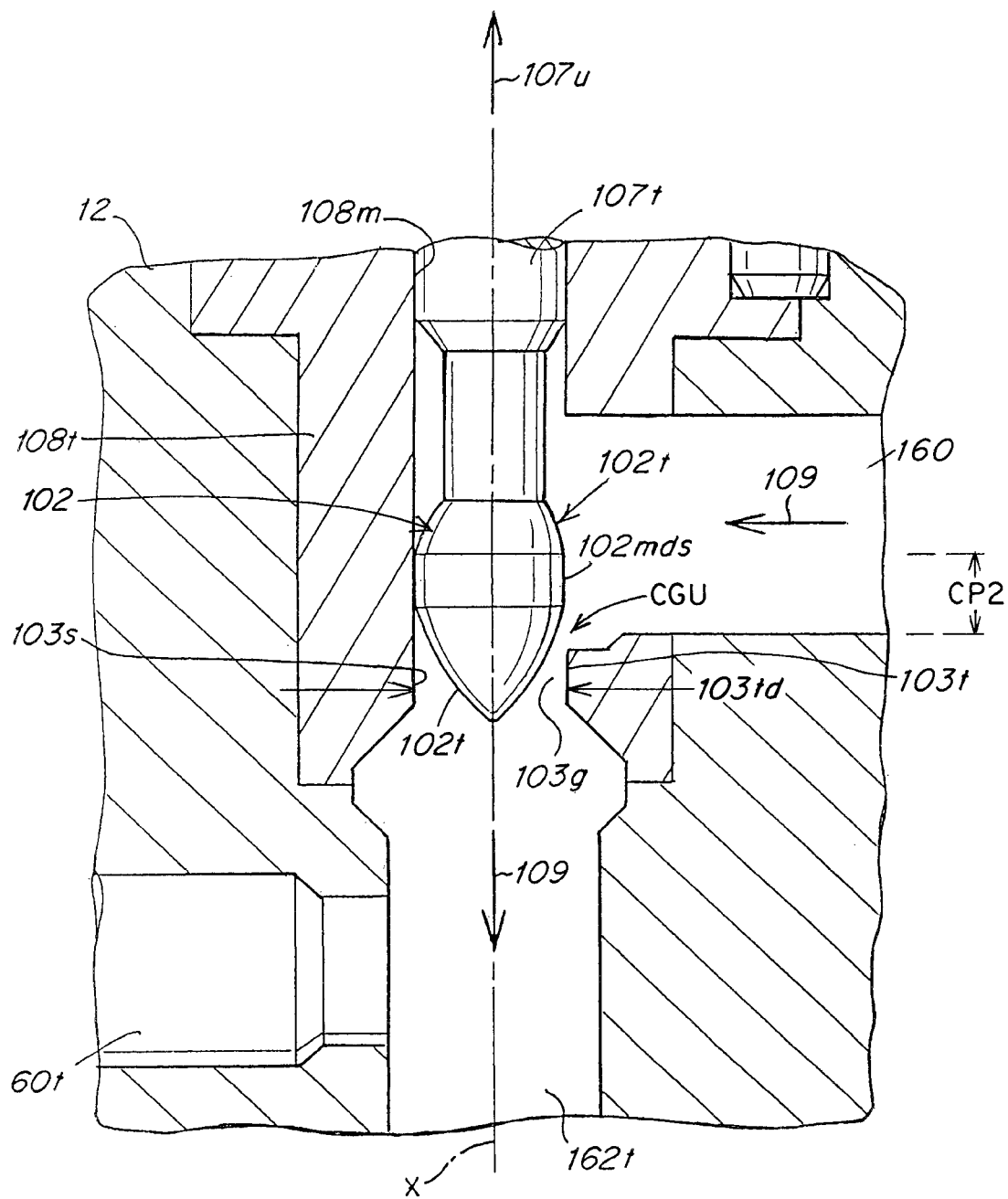
FIG. 5E is a view similar to FIG. 5C showing the converse of FIG. 5D where the valve pin is disposed upstream relative to the throat 103t such that the control surface 102t of the pin opens the flow channel upon upstream movement of the pin from the FIG. 5C position, and creates flow at a restricted rate over a select range of upstream path of travel by creating a restriction gap 103g upstream of the throat 103t, 103td that is restricted relative to a gap that is created when the pin is fully withdrawn upstream where the control surface 102t is in a position that enables maximum flow.

FIGS. 5C-5E show an alternative melt flow controller embodiment in which a pin 107t is slidably mounted in a mounting channel 108m having a protrusion or bulbous portion 102 without a downstream needle extension that can close the gate 34. In such an embodiment, the control surface (43, 45, 102m and complementary surface of the flow channel disposed upstream and away from the gate is the sole mechanism by which fluid flow is stopped at both the beginning and end of an injection cycle by positioning the pin 107t at a position as shown in FIG. 5C. As with the control surface 43, 45, 102m of FIGS. 5-5C, the control surface 43, 45, 102m of FIGS. 5C-5E has a diameter equal to the maximum diameter of midsection 102md of the fluid contacting member 102 such that the pin 107t can be entirely withdrawn in the direction 107u from the manifold and bushing 108t and readily replaced without disassembling any portion of the manifold or bushing 108t. The maximum diameter midsection 102md typically has the same or about the same diameter as the complementary flow restricting throat surface 103s of the bushing 108t such that when the two surfaces mate flow is stopped.

In the specific examples described herein, the control surface 43, 45, 102m is illustrated as circular circumferential surface of a bulb or bulbous protrusion 102. The control surface 43, 45, 102m and its complementary channel surface 47, 103s can be configured to have any geometrical shape such as square, hexagonal, oval or the like other than circular as long as the two surfaces can mate or engage each other such that flow of injection material is stopped when the two surfaces mate or engage with each other.

As shown in FIGS. 5D, 5E, the rate of flow and the size of the flow rate determining gap 103g can be controllably varied by either upstream movement 107u, FIG. 5E or downstream movement, 107d, FIG. 5D of pin 107t. Upstream movement 107u can form gap 103g between bushing surface 108g, FIG. 5E, and the lower outer control surface 102t of member 102. Downstream movement 107d, FIG. 5D, can also form a gap 103g between channel surfaces 103s, 108g and the upper portion of the outer control surface 102t of member 102. As described above, controlled movement of pin 107t by controller 16 controls the size of the gap 103g and thus the rate of flow from upstream channel 160 to downstream channel 162t which leads to downstream channel 190 or 200 or the like. Axis X of pin 107t as shown in FIGS. 5D-5F is not coaxial with the axis of the downstream bore or flow channel such as channel 940c, 941c, 942c that leads at its distal end to a gate such as gate 32, 34, 36.

Figure 5F:
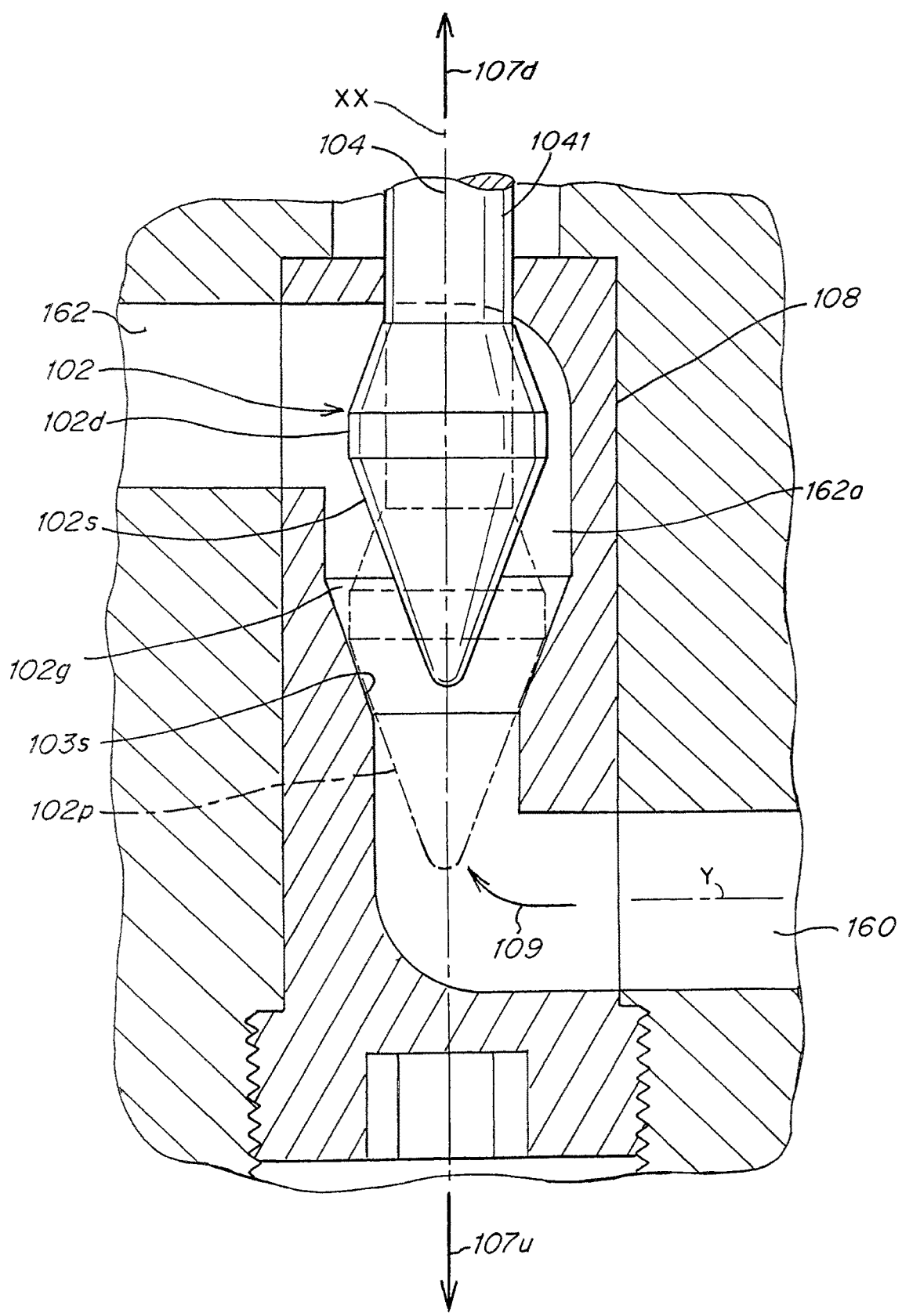
FIG. 5F is an enlarged fragmentary cross-sectional view of another embodiment of an upstream away from the gate flow control pin surface and complementary channel surface where the pin has a conically shaped outer control surface that can be controllably disposed in a range of axial travel path positions relative to a complementary conically configured interior channel surface 103s such that the size of a flow control gap 102g can be controllably varied thus enabling a varying rate of flow of injection material. In this embodiment, the linear axis of travel XX of the valve pin 1041 is non coaxial relative to the axis Y of a downstream flow channel 160 that delivers injection material from the channel 941c in which the valve pin 1041 is reciprocally driven along axis XX.
Figure 5G:
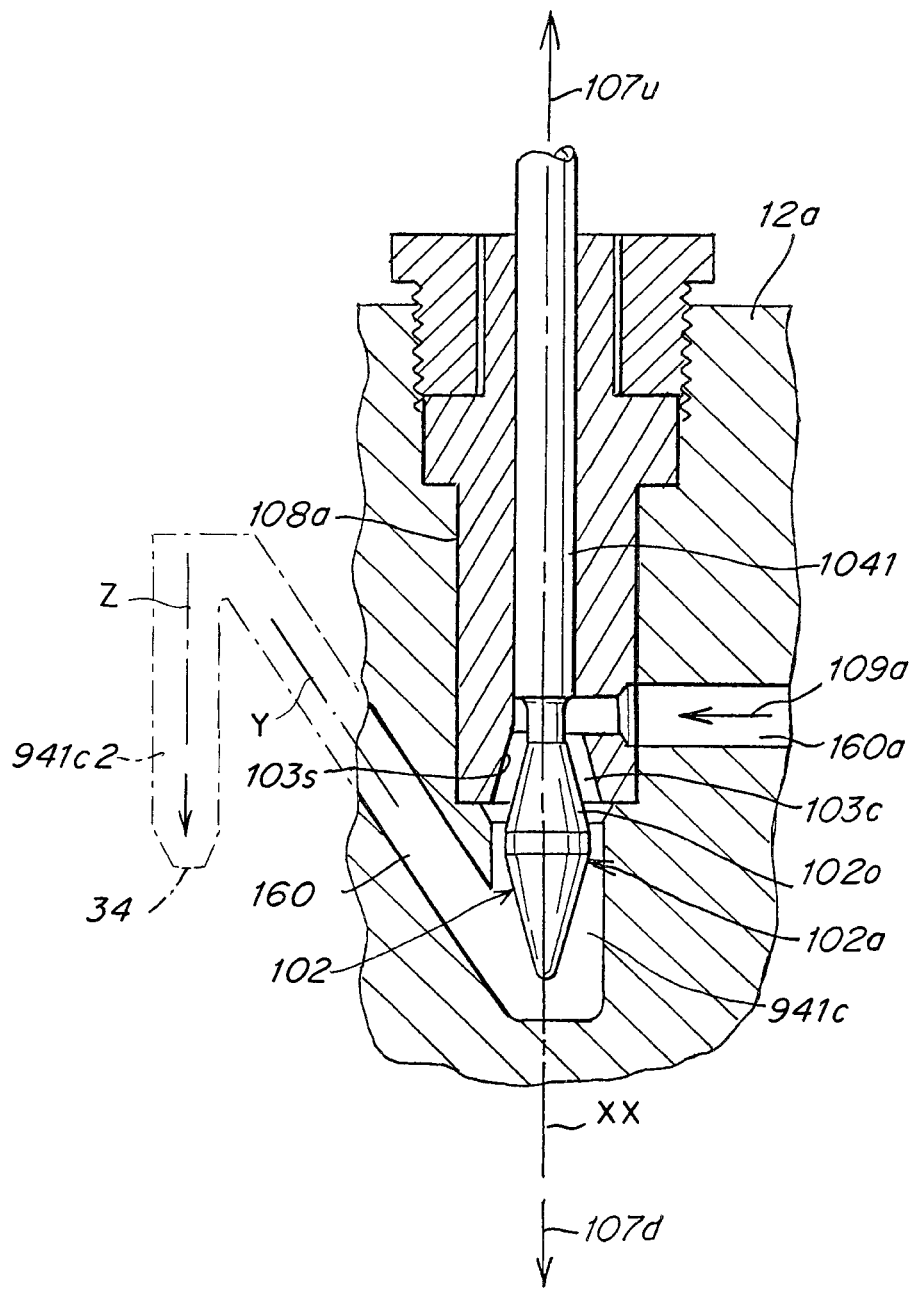
FIG. 5G is an enlarged fragmentary cross-sectional view of another embodiment of an upstream away from the gate flow control pin surface and complementary channel surface where the pin has a conically shaped outer control surface that can be controllably disposed in a range of axial travel path positions relative to a complementary conically configured interior channel surface 103s such that the size of a flow control gap 102g can be controllably varied thus enabling a varying rate of flow of injection material. In this embodiment, the linear axis of travel XX of the valve pin 1041 is non coaxial relative to the axes Y, Z of downstream flow channels 160, 941c2 that delivers injection material from the channel 941c in which the valve pin 1041 is reciprocally driven along axis XX.
Figure 6:
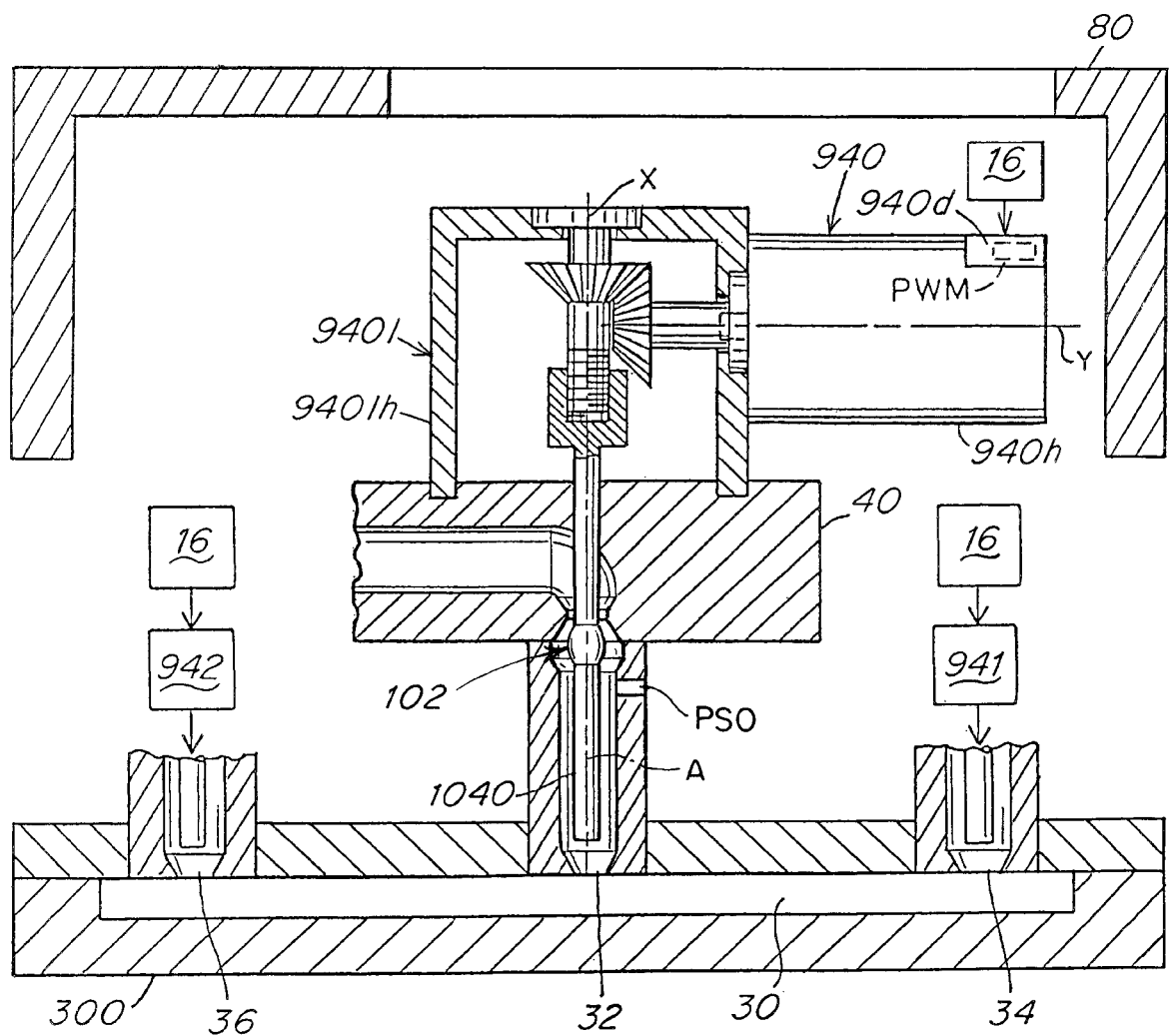
FIG. 6 is a side sectional schematic view of one embodiment of an electric actuator having an electric drive device mounted on, to or within the housing of the actuator and where the drive axis of the actuator is non coaxially arranged relative to the movement axis of the valve pin, and is interconnected to a linear travel converter, the valve pin having a flow control bulb or protrusion, complementary channel surface and controller with programming designed to enable pin position control based at least in part on matching pressure within the flow channel to a predetermined profile of pressures.
Figure 7:
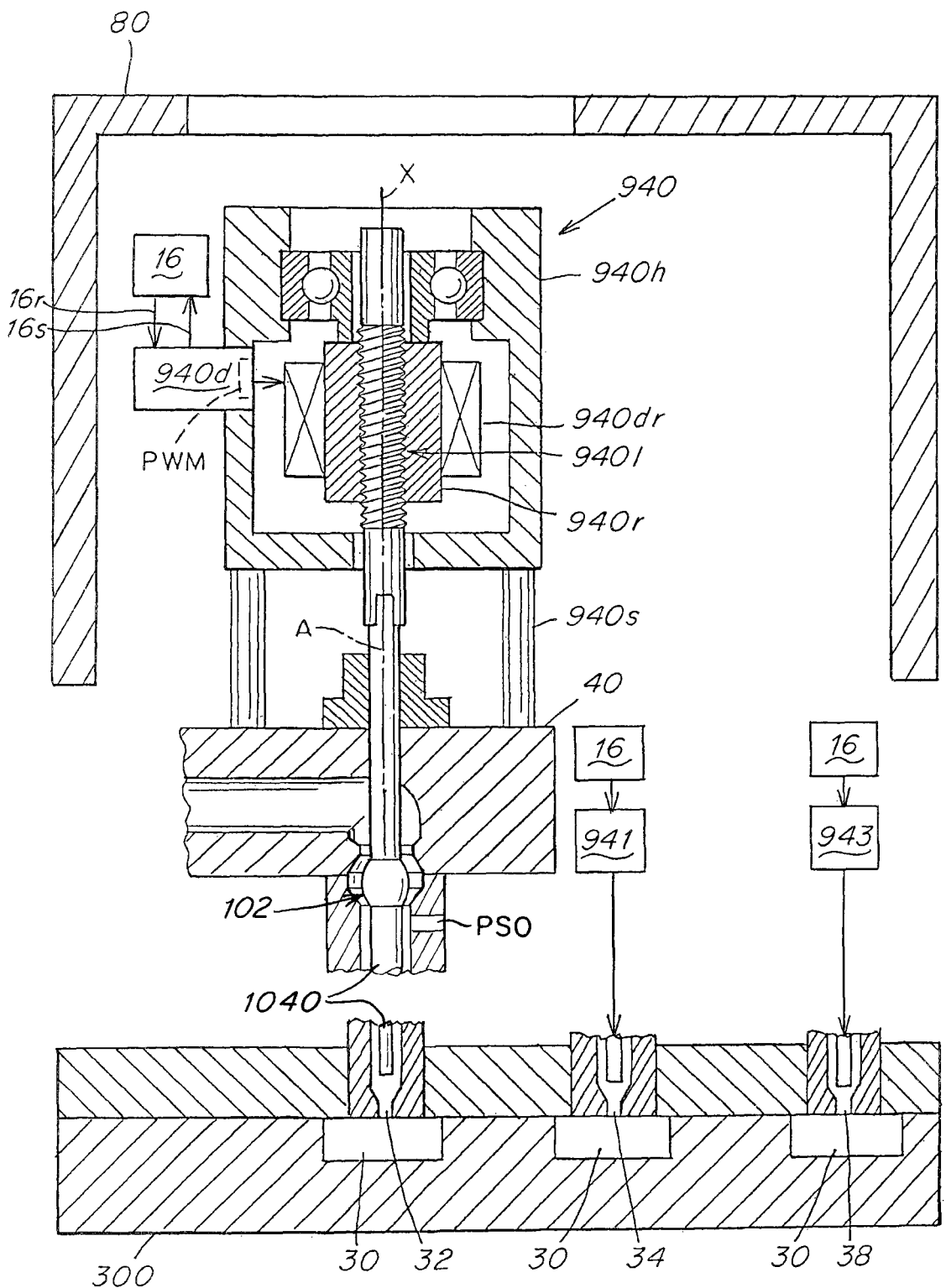
FIG. 7 is a side sectional schematic view of another embodiment of an electric actuator having an electric drive device mounted on, to or within the housing of the actuator and where the drive axis of the actuator is coaxially arranged relative to the movement axis of the valve pin, the valve pin having a flow control bulb or protrusion, complementary channel surface and a controller with programming designed to enable pin position control based at least in part on matching pressure within the flow channel to a predetermined profile of pressures.
Figure 8:
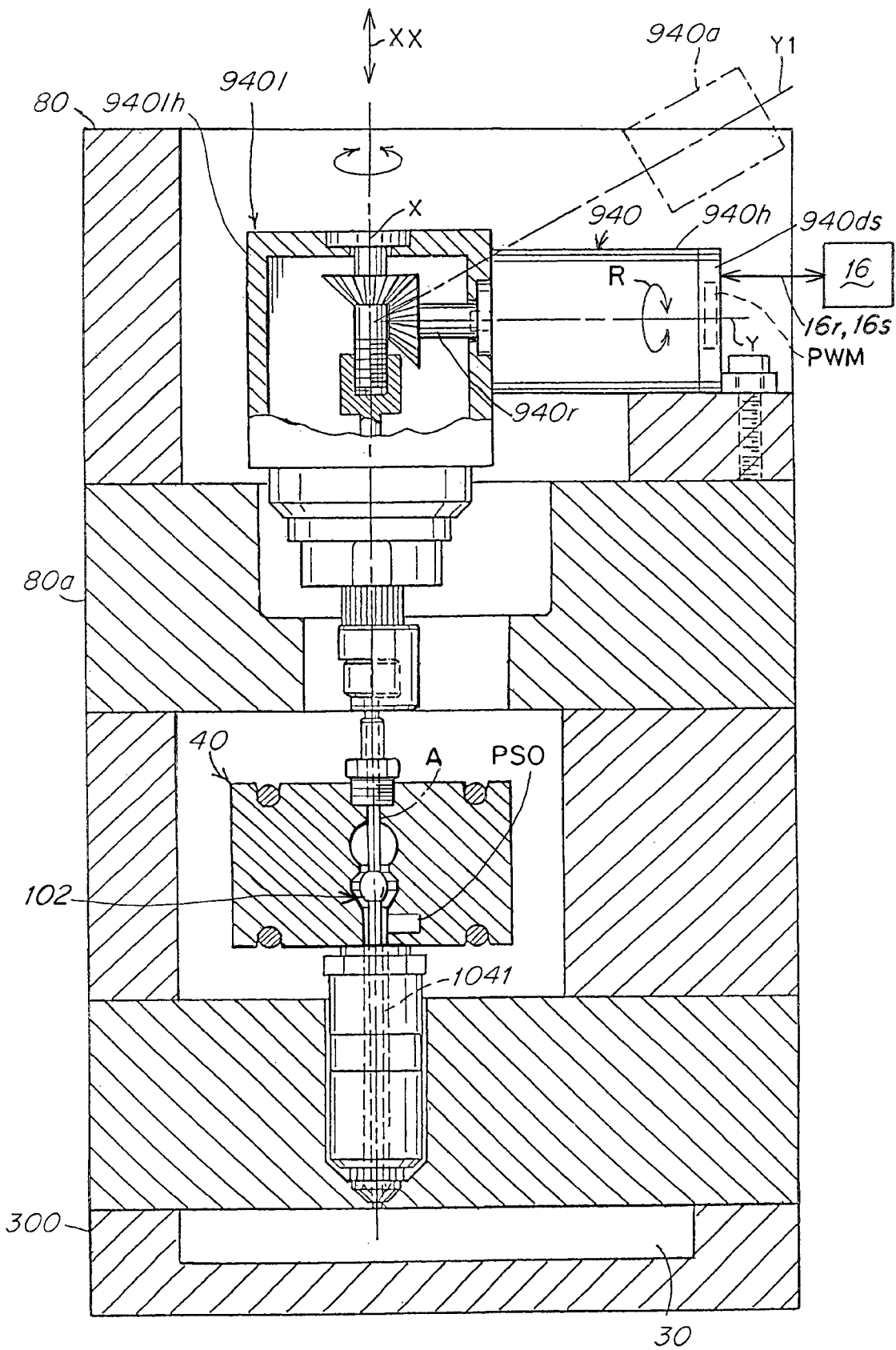
FIG. 8 is a side sectional schematic view of another embodiment of an electric actuator having an electric drive device mounted on, to or within the housing of the actuator and where the drive axis of the actuator is non coaxially arranged relative to the movement axis of the valve pin and is interconnected to a linear travel converter, the actuator housing is mounted to the top clamp plate, the valve pin having a flow control bulb or protrusion, complementary channel surface and a controller with programming designed to enable pin position control based at least in part on matching pressure within the flow channel to a predetermined profile of pressures.
Figure 9:
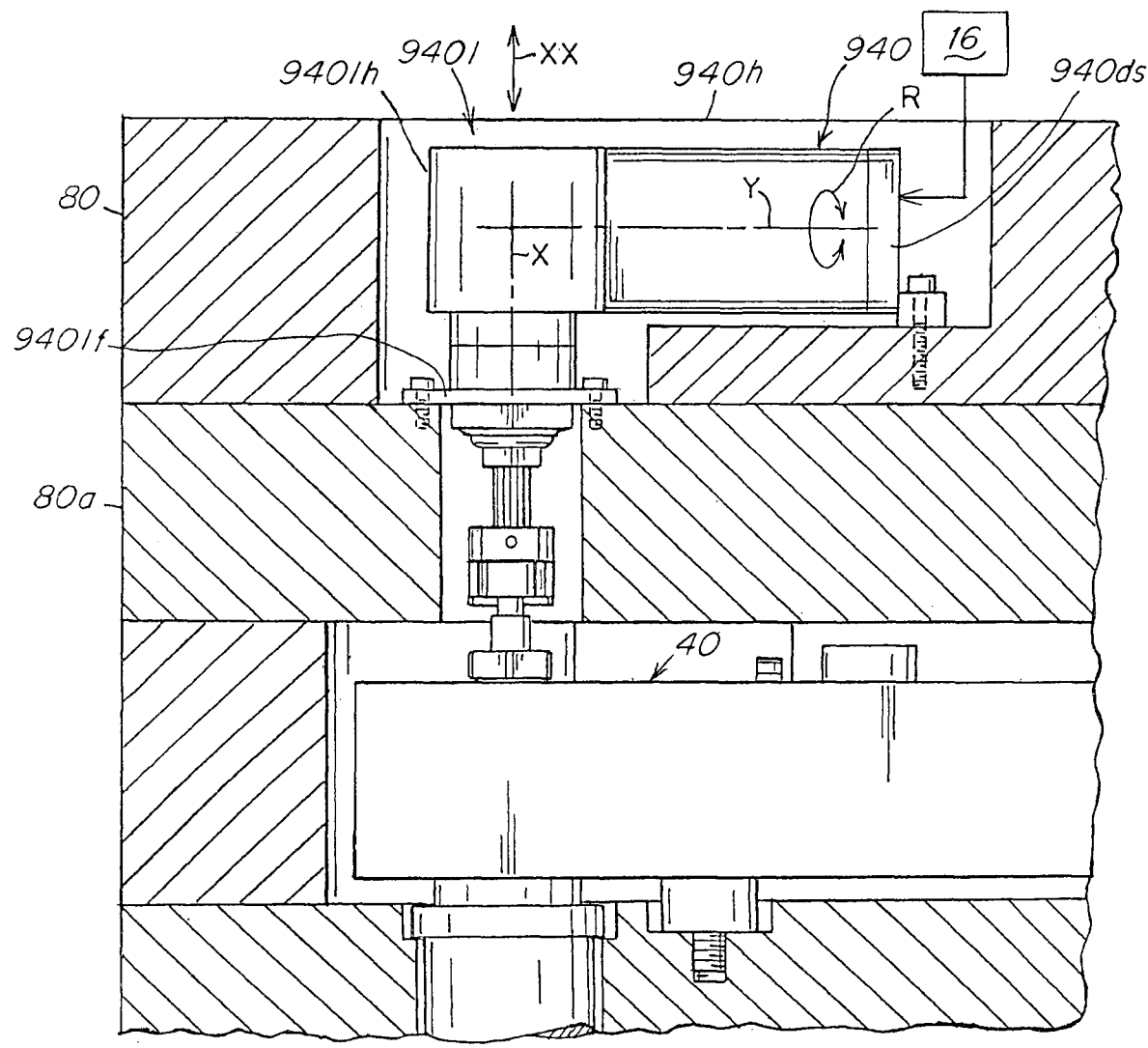
FIG. 9 is a side sectional schematic view of another embodiment of an electric actuator having an electric drive device mounted on, to or within the housing of the actuator and where the drive axis of the actuator is non coaxially arranged relative to the movement axis of the valve pin and is interconnected to a linear travel converter, the actuator housing is mounted to the linear travel converter housing which is in turn mounted to the top clamp plate, the valve pin having a flow control bulb or protrusion, complementary channel surface and a controller with programming designed to enable pin position control based at least in part on matching pressure within the flow channel to a predetermined profile of pressures.
Figure 10:
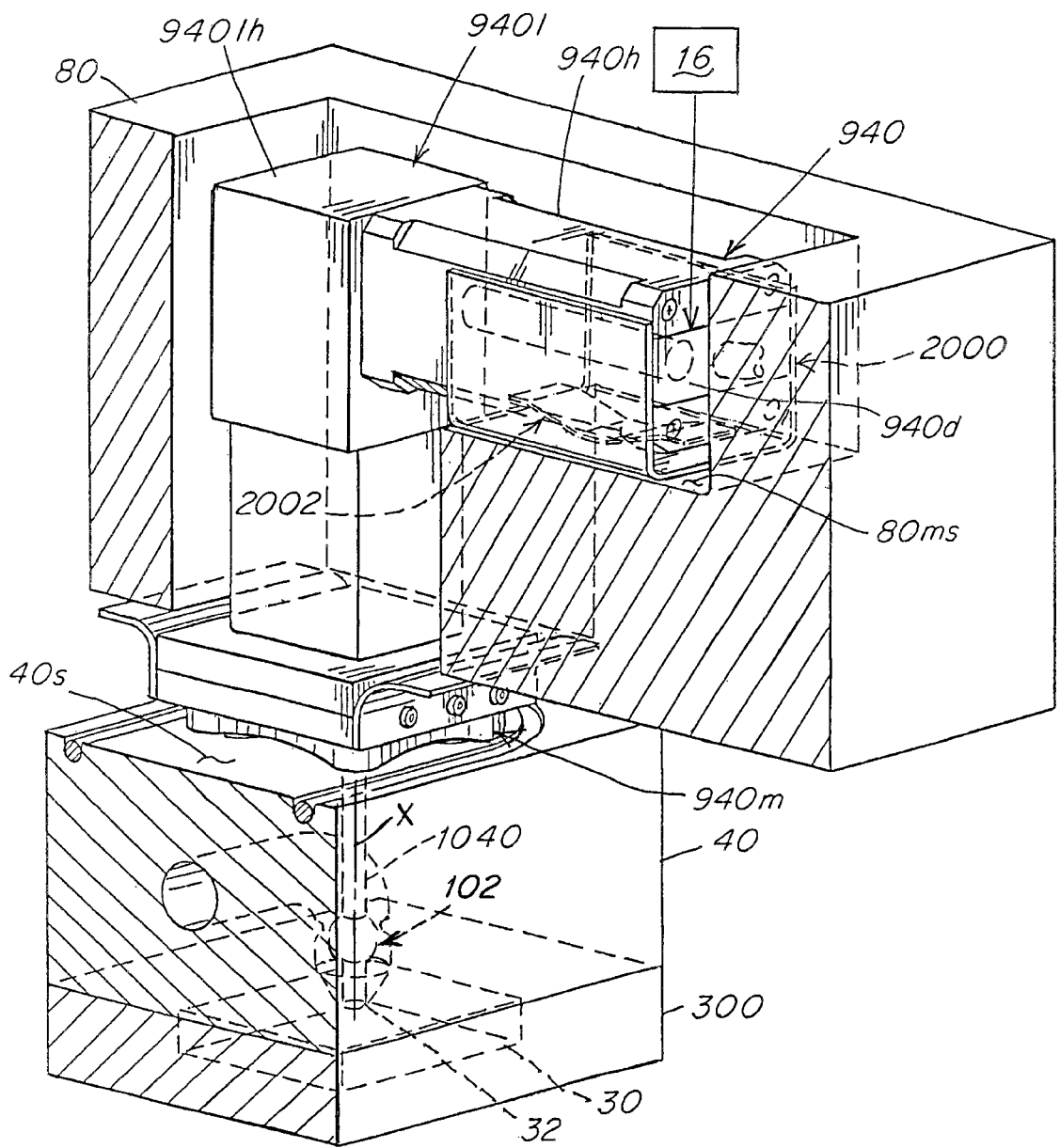
FIG. 10 is a side sectional schematic view of another embodiment of an electric actuator having an electric drive device mounted on, to or within the housing of the actuator and where the drive axis of the actuator is non coaxially arranged relative to the movement axis of the valve pin and is interconnected to a linear travel converter, the actuator housing is mounted to the top clamp plate, the valve pin having a flow control bulb or protrusion, complementary channel surface and a controller with programming designed to enable pin position control based at least in part on matching pressure within the flow channel to a predetermined profile of pressures.
Figure 11A:
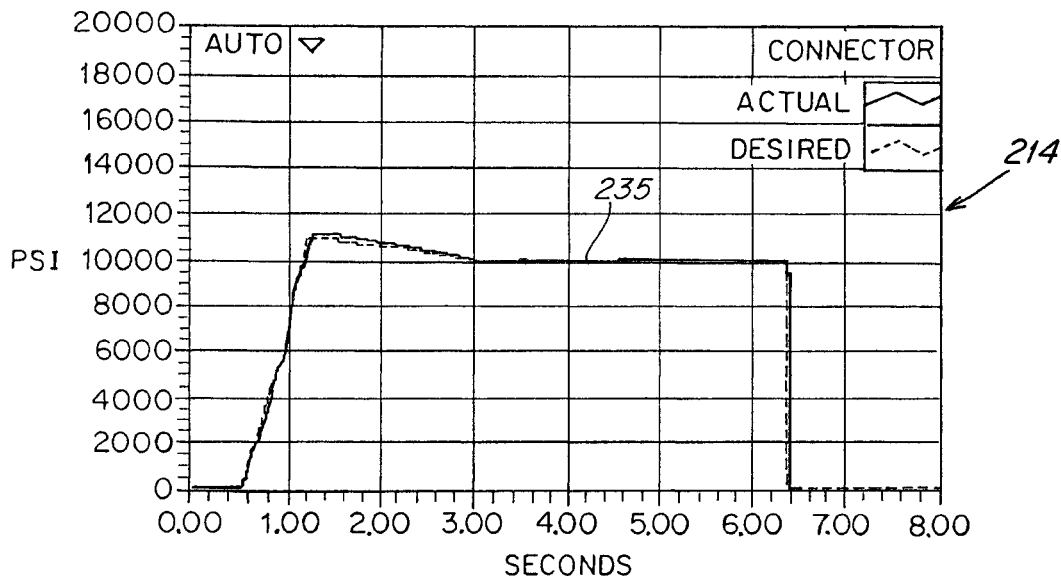
FIG. 11a is one example of an injection cycle profile of pressure of injection material measured at a position immediately downstream of the axial position within a fluid delivery channel as described herein where a control surface of a valve pin interfaces with a complementary surface of the fluid delivery channel to vary a control flow gap.
Figure 11B:
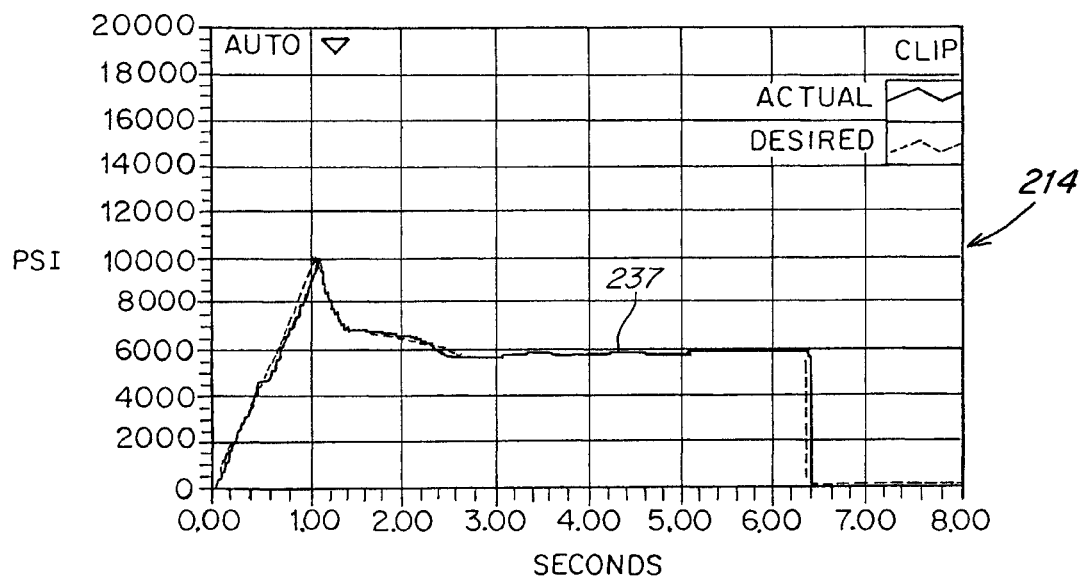
Figure 11C:
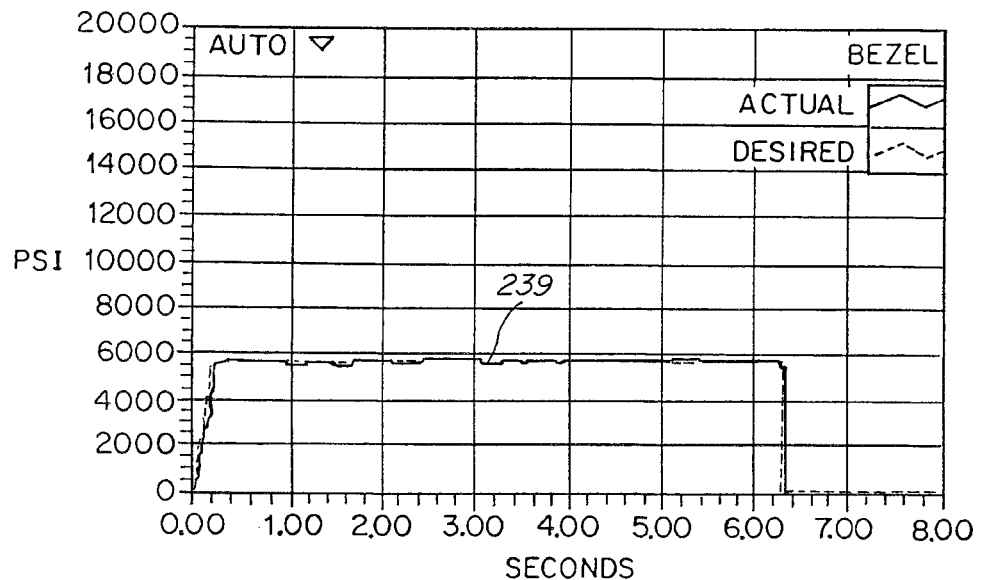
Figure 11D:
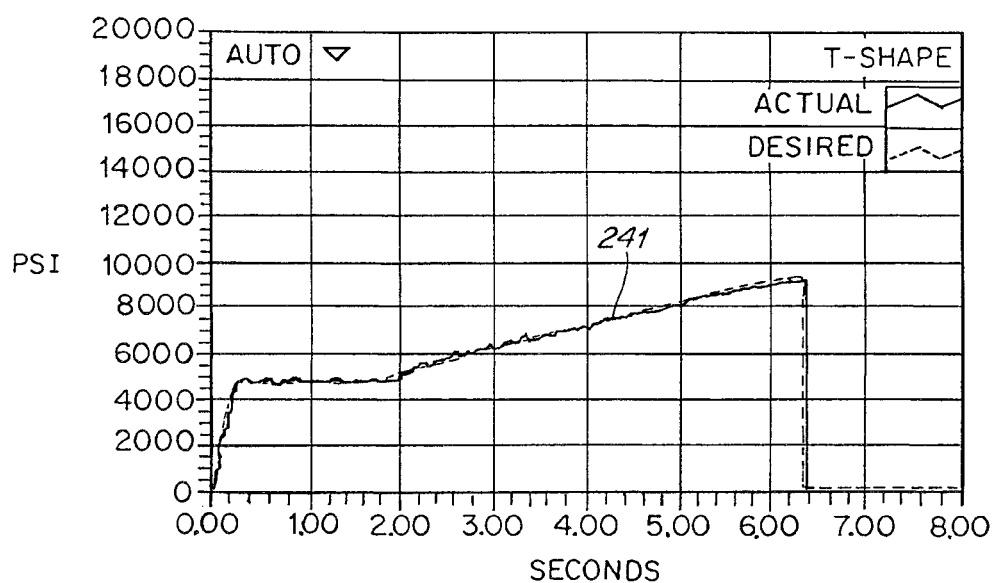

FIG. 5F shows another embodiment of a valve having a pin that is non coaxially arranged relative to the axis of a downstream channel that delivers fluid to a gate of a cavity of a mold. In the FIG. 5F embodiment the valve pin 107 has a protrusion 102 with an outside surface 102s which is complementary to a mating surface 103 disposed downstream of the protrusion within the flow channel 160. When the two surfaces mate, i.e. when the member 102 is in the position 102p in dashed lines in FIG. 5F, flow is stopped. Between the 102p position and the solid line 102 position shown in FIG. 2, the gap 102g varies in size and the rate of fluid flow varies depending on the size of the gap. In this embodiment, the fluid flow rate decreases on forward upstream movement 107u of pin 107. Upstream movement of a fluid contacting member, pin or the like means that the member moves against or in the opposite direction of the flow of the fluid. Downstream movement means that the member moves in the same direction as the flow of fluid. Upstream movement to decrease and/or stop flow rate is typically preferred. In the FIG. 5F embodiment, the rate of flow is increased by upstream movement of the fluid contacting member 102 and decreased by downstream movement. And, the position at which fluid flow rate is controlled is located within a channel 162a having an axis such as 104 which is not coaxial with the downstream channels 941c (not shown) that have an axis that intersects a gate leading to a mold cavity.

The embodiments described control the rate of melt flow away from the gate along a channel axis offset from a channel having an axis intersecting and leading to a gate thus enabling control of flow rate to multiple channels intersecting multiple gates. Controlling the melt flow away from the gate also enables a pressure or other material condition sensor to be located away from a gate.

In the FIGS. 3, 3A, 3B, 4, 4A, 4B, 5, 5A, 5B, 5C, 5D, 5E embodiments, the diameter 103td of the throat surface 103ts that is intended to mate with a complementary mating outer circumferential surface 102md, 102mds of the pin 1041 has a maximum diameter of about 10 to 12 mm and preferably a maximum diameter of about 8 to 9 mm such that upstream reactive forces exerted by the injection fluid on the pin and upstream to the motor rotor are minimized thus enabling use of a smaller sized electric motor actuator. In the FIGS. 5-5E embodiments, the diameter 102pd of the mating surface 102mds of the pin 1041 is preferably adapted to be the same or about the same as the diameter 103td of the flow control throat surface 103ts such that when the pin 1041 is positioned in a position where the mating surface 102mds is axially aligned with the maximum diameter throat surface 103ts, injection material flow through the throat 103t, and thus through the gate 34, is stopped or substantially stopped.

The controller 16 typically comprises for example a PID controller and a CPU. The CPU can execute a PID (proportional, integral, derivative) algorithm which compares the sensed pressure (at a given time) from the pressure sensor or transducer to a target pressure (for the given time). The CPU instructs the PID controller to adjust the position of the valve pin 1040, 1041, 1042 to mirror the target pressure for that given time by instructing the electric actuator via communication of control drive signals DC through the electrical drive 940d, 941d, 942d.

FIGS. 6, 7, 8, 8A, 9, 9A, 10 show various configurations of electric actuators having controllably drivable rotors that can be used in conjunction with the electric drive element 940d, 941d, 942d and the controller 16 to effect communication of electrical control signals from the controller 16 to the electric driver elements 940dr, 941dr, 942dr of the actuator.

Linearly driven actuators or linear actuators can alternatively be used in place of rotary electric actuators. One example of a linear actuator that uses electric energy to directly produce linear motion in instead of rotary motion, is a proportional solenoid as shown in FIG. 8A that effects analog positioning of a solenoid plunger or rod 940ld, typically a pin driver, as a function of coil current contained in the armature or driver 940dr. Another linear actuator alternative is a solenoid or linear motor, FIG. 9A, that employs a flux carrying geometry that can produce a high starting force on the plunger, pin driver or rod 940ld to cause the plunger, pin driver or rod 940ld to be controllably driven along the linear drive axis A. The resulting force (torque) profile as the solenoid progresses through its operational stroke is nearly flat or descends from a high to a lower value.

The solenoid can be useful for positioning, stopping mid-stroke, or for low velocity linear actuation movement of the plunger or rod 940ld, especially in a closed loop control system. The proportional concept is more fully described in SAE publication 860759 (1986) the disclosure of which is incorporated by reference in its entirety as if fully set forth herein.

The linear motor, FIG. 9A, produces a linear force along its drive axis A. A typical mode of operation is as in a Lorentz-type actuator, in which applied force is linearly proportional to applied current and magnetic field. Thus a linear actuator 940, FIGS. 8A, 9A, that effects linear driven movement of a rod, pin driver or plunger or equivalent element 940ld can be employed as an alternative to a rotary driven electric motor for interconnection to a valve pin 50, 1040 to effect controllable driven linear movement of the valve pin 50, 1040, 1041 along its axis X of reciprocal movement as described hereinabove.

A linear actuator is particularly suited for use in a configuration where the drive axis of the actuator and the pin movement axis X are coaxially arranged such as in the embodiments described with reference to FIGS. 4, 5, 6, 7 and the like. A linear actuator as described can be used to drive any pin drive member 940ld as an alternative to the rotor based actuators described herein.

Although in the disclosed embodiments the sensed condition is preferably pressure, other sensed conditions can be used which relate to melt flow rate. For example, the position of the valve pin. Pressure is typically measured by a pressure transducer that measures pressure of the injection material directly or indirectly such as via measurement of the load on the valve pin via a load sensor. Alternatively a position sensor could be used to feed back the sensed condition (position) to the PID controller. In the same manner as explained above, the CPU would use a PID algorithm to compare the sensed condition to a programmed target position profile or load profile for the particular gate to the mold cavity, and adjust the valve pin accordingly.

Where a position sensor is used to generate a signal indicative of the position of the pin, a sensor that senses position of the valve pin directly can be used such as a Hall Effect sensor or a light sensor. Alternatively, a sensor that detects position of the rotor of the electric actuator, such as an encoder, could be used to generate a position signal that is indicative of the position of the valve pin.

As used in this application with regard to various monitoring and control systems, the terms "controller," "component," "computer" and the like are intended to refer to a computer-related entity, either hardware, a combination of hardware and software, software, or software in execution. For example, a component or controller may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Claimed methods of the present invention may also be illustrated as a flow chart of a process of the invention. While, for the purposes of simplicity of explanation, the one or more methodologies shown in the form of a flow chart are described as a series of acts, it is to be understood and appreciated that the present invention is not limited by the order of acts, as some acts may, in accordance with the present invention, occur in a different order and/or concurrent with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

In various embodiments of the invention disclosed herein, the term "data" or the like means any sequence of symbols (typically denoted "0" and "1") that can be input into a computer, stored and processed there, or transmitted to another computer. As used herein, data includes metadata, a description of other data. Data written to storage may be data elements of the same size, or data elements of variable sizes. Some examples of data include information, program code, program state, program data, other data, and the like.

As used herein, computer storage media or the like includes both volatile and non-volatile, removable and non-removable media for storage of information such as computer-readable instructions, data structures, program modules, or other data. Computer storage media includes RAM, ROM, EEPROM, FLASH memory or other memory technology, CD-ROM, digital versatile disc (DVDs) or other optical disk storage, magnetic cassettes, magnetic tape, magnetic disk storage or other magnetic storage devices, or any other medium which can be used to store desired information and which can be accessed by the computer.

The methods described herein may be implemented in a suitable computing and storage environment, e.g., in the context of computer-executable instructions that may run on one or more processors, microcontrollers or other computers. In a distributed computing environment (for example) certain tasks are performed by remote processing devices that are linked through a communications network and program modules may be located in both local and remote memory storage devices. The communications network may include a global area network, e.g., the Internet, a local area network, a wide area network or other computer network. It will be appreciated that the network connections described herein are exemplary and other means of establishing communications between the computers may be used.

A computer may include one or more processors and memory, e.g., a processing unit, a system memory, and system bus, wherein the system bus couples the system components including, but not limited to, the system memory and the processing unit. A computer may further include disk drives and interfaces to external components. A variety of computer-readable media can be accessed by the computer and includes both volatile and nonvolatile media, removable and nonremovable media. A computer may include various user interface devices including a display screen, touch screen, keyboard or mouse.

A "controller," as used herein also refers to electrical and electronic control apparatus that comprise a single box or multiple boxes (typically interconnected and communicating with each other) that contain(s) all of the separate electronic processing, memory and electrical signal generating components that are necessary or desirable for carrying out and constructing the methods, functions and apparatuses described herein. Such electronic and electrical components include programs, microprocessors, computers, PID controllers, voltage regulators, current regulators, circuit boards, motors, batteries and instructions for controlling any variable element discussed herein such as length of time, degree of electrical signal output and the like. For example a component of a controller, as that term is used herein, includes programs, controllers and the like that perform functions such as monitoring, alerting and initiating an injection molding cycle including a control device that is used as a standalone device for performing conventional functions such as signaling and instructing an individual injection valve or a series of interdependent valves to start an injection, namely move an actuator and associated valve pin from a gate closed to a gate open position. In addition, although fluid driven actuators are employed in typical or preferred embodiments of the invention, actuators powered by an electric or electronic motor or drive source can alternatively be used as the actuator component.

The injection molding machine IMM, 500, 13 typically includes its own internal manufacturer supplied machine controller that generates standardized beginning of cycle gate closed and end of cycle gate open and gate closed machine voltage signals VS typically 0 volts for gate open and 24 volts for gate open (or 0 volts and 120 volts respectively). The standardized machine voltage signals VS can be sent to a signal conversion device that converts the injection machine voltage signals to a signal usable by the controller 16 and the electric drive (940*d*, 941*d*, 942*d*) of an electric actuator to cause the electric actuator to move the valve pin to a gate closed or gate open actuator position. The controller (16) can utilize these start and end of injection cycle signals together with position signals (POS0*s*, POS1*s*, POS2*s*) that are indicative of position of the valve pin 1040, 1041, 1042 that are generated by a position sensor (POS0, POS1, POS2), to instruct an electric actuator (940, 941, 942) to drive or move a valve pin to one or more predetermined positions such as a start or end cycle position. Or the position signals can be used by the controller to instruct the actuator to move or drive the valve pin to another intermediate position during the course of an injection cycle such as a position at which the pin serves to control rate of injection fluid flow or injection material pressure such that the injection material is held at a "pack" phase pressure for a predetermined period of time prior to the end of the cycle when the gate to the cavity is closed.

The position sensor signals POS0*s*, POS1*s*, POS2*s* and their associated position sensors POS, PS0, PS1, PS2, PS0*a*, PS1*a*, PS2*a* can also be used as an input to a set of instructions included in the program contained in controller 16 that operates to correct or adjust axial position of the valve pin 1040, 1041, 1042 by a predetermined degree either upstream or downstream depending on the difference between the value of the target or predetermined pressure profile and the value of the real time pressure sensed at any given point in time during the injection cycle. The degree of adjustment or correction in axial positioning of the valve pin, and thus the precise positioning of the axial positioning of control surface 102*m*, 102*t* is the degree or amount of travel distance that is required to reduce or increase the real time pressure to match or to approach the value of the predetermined target pressure at any given point in time during the course of the injection cycle. This degree of adjustment distance is predetermined and is input to the program as a variable that is utilized in the control program to send movement adjustment signals from the controller 16 to the electric drive 940*d*, 941*d*, 942*d* for an actuator. The goal of the program is to instruct the actuators to drive the valve pins to an axial position over the course of the entire injection cycle that produces a sensed or real time injection material pressure that matches the predetermined profile of target pressures as closely as possible.

The program contained within the controller (16) can include instructions that utilize a position signal POS0*s*, POS1*s*, POS2*s* to instruct an actuator (14, 940, 941, 942) to move a corresponding valve pin (1040, 1041, 1042) to one or more predetermined positions during the course of an injection cycle that can include one or more of (a) an initial position of the valve pin (1040, 1041, 1042) at start of the injection cycle, (b) an end position of the valve pin at the end of the injection cycle, and (c) one or more intermediate positions of the valve pin between the initial position and the end position.

The program can include instructions that utilize the position signal (POS0*s*, POS1*s*, POS2*s*) to adjust sensed axial position of the valve pin by a travel distance or amount that causes the control surface (102*m*, 102*t*) to adjust real time pressure of the injection material at one or more times over the course of the injection cycle to a value that approaches or matches a predetermined target pressure value for the one or more times over the course of the injection cycle.

The program can include instructions that utilize a predetermined error value to determine the travel distance. The predetermined error value typically corresponds or is proportional to one or more of (a) an error in accuracy of the value of sensed pressure and (b) a difference in value between sensed pressure and the predetermined target pressure.

FIGS. 11*a*, 11*b*, 11*c*, 11*d* show time versus pressure graphs (235, 237, 239, 241) of the pressure detected by four pressure transducers associated with four nozzles mounted in a manifold block (not shown). The four nozzles can be substantially similar to or the same as the nozzles shown in FIGS. 1-5C and include pressure transducers interconnected to a controller 16 as described herein. The FIGS. 11*a-d* plots are generated on a user interface 214 so that a user can observe the tracking of the actual pressure versus the target pressure during the injection cycle in real time, or after the cycle is complete. The four different graphs of FIGS. 11*a*-11*d* show as an example four independent target pressure profiles ("desired") emulated by the four individual nozzles. Different target profiles are desirable to uniformly fill different sized individual cavities associated with each nozzle, or to uniformly fill different sized sections of a single cavity. Graphs such as these can be generated with respect to any of the previous embodiments described herein.

In the FIGS. 11*a*-11*d* example, the valve pin associated with plot 235 is opened sequentially at 0.5 seconds after the valves associated with the other three graphs (237, 239 and 241) were opened at 0.00 seconds. In a system employing a pin configured with a flow control protrusion such as 102 and associated flow control bore surface such as 103*s* that are disposed upstream and away from the gate together with an extended needle portion such as extension 1041*e*, just before the pin is opened at the beginning of the cycle, the valve pins are in the position shown in FIGS. 5, 5A, 5B such that flow is stopped at the throat 103*t*. At approximately 6.25 seconds at the end of the injection cycle all four valve pins are in the position shown in FIGS. 3, 3A, 3B where flow of injection material is stopped by the mating of the tip end 1041*de* with the gate surface GS at the gate 34. During injection (for example, 0.00 to 1.0 seconds in FIG. 11*b*) and pack (for example, 1.0 to 6.25 seconds in FIG. 11*b*) portions of the plots, each valve pin is controlled to a plurality of positions such as FIGS. 4, 4A, 4B between the FIGS. 3 and 5 to alter the pressure sensed by the pressure transducer PS0, PS1, PS1*a*, PS2, PS2*a* associated with each valve to track the target pressure.

Through the user interface 214, target profiles can be designed, and changes can be made to any of the target profiles using standard windows based editing techniques.

Figure 12:
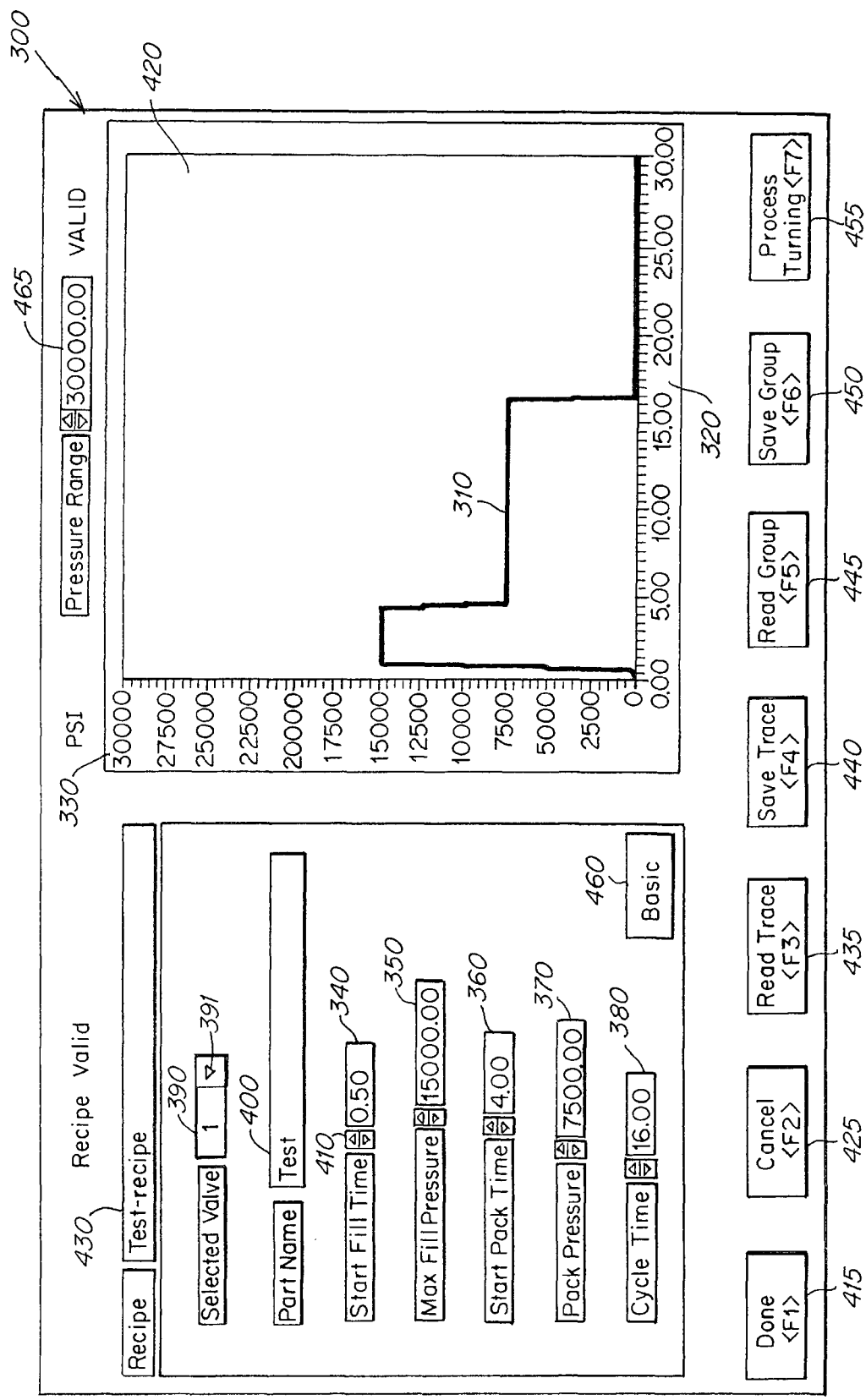
FIG. 12 is an example of a user interface displaying component and function fields that enable a user to display, use, create, edit and store target pressure profiles.

The profiles are then input to memory and used by controller 16 to control the position of the valve pin. For example, FIG. 12 shows an example of a profile creation and editing screen icon 300 generated on interface 214.

Screen icon 300 is generated by a windows-based application performed on interface 214. Alternatively, this icon could be generated on an interface associated with controller 6. Screen icon 300 provides a user with the ability to create a new target profile or edit an existing target profile for any given nozzle and cavity associated therewith. A profile 310 includes (x, y) data pairs, corresponding to time values 320 and pressure values 330 which represent the desired pressure sensed by the pressure transducer for the particular nozzle being profiled. The screen icon shown in FIG. 12 is shown in a "basic" mode in which a limited group of parameters are entered to generate a profile. For example, in the foregoing embodiment, the "basic" mode permits a user to input start time displayed at 340, maximum fill pressure displayed at 350 (also known as injection pressure), the start of pack time displayed at 360, the pack pressure displayed at 370, and the total cycle time displayed at 380.

The screen also allows the user to select the particular valve pin they are controlling displayed at 390, and name the part being molded displayed at 400. Each of these parameters can be adjusted independently using standard windows-based editing techniques such as using a cursor to actuate up/down arrows 410, or by simply typing in values on a keyboard. As these parameters are entered and modified, the profile will be displayed on a graph 420 according to the parameters selected at that time.

By clicking on a pull-down menu arrow 391, the user can select different nozzle valves in order to create, view or edit a profile for the selected nozzle valve and cavity associated therewith. Also, a part name 400 can be entered and displayed for each selected nozzle valve.

The newly edited profile can be saved in computer memory individually, or saved as a group of profiles for a group of nozzles that inject into a particular single or multi-cavity mold. The term "recipe" is used to describe a group of profiles for a particular mold and the name of the particular recipe is displayed at 430 on the screen icon.

To create a new profile or edit an existing profile, first the user selects a particular nozzle valve of the group of valves for the particular recipe group being profiled. The valve selection is displayed at 390. The user inputs an alpha/numeric name to be associated with the profile being created, for family tool molds this may be called a part name displayed at 400. The user then inputs a time displayed at 340 to specify when injection starts. A delay can be with particular valve pins to sequence the opening of the valve pins and the injection of melt material into different gates of a mold.

The user then inputs the fill (injection) pressure displayed at 350. In the basic mode, the ramp from zero pressure to max fill pressure is a fixed time, for example, 0.3 seconds. The user next inputs the start pack time to indicate when the pack phase of the injection cycle starts. The ramp from the filling phase to the packing phase is also fixed time in the basic mode, for example, 0.3 seconds.

The final parameter is the cycle time which is displayed at 380 in which the user specifies when the pack phase (and the injection cycle) ends. The ramp from the pack phase to zero pressure will be instantaneous when a valve pin is used to close the gate, as in the embodiment of FIG. 13, or slower in a thermal gate (see FIG. 1) due to the residual pressure in the cavity which will decay to zero pressure once the part solidifies in the mold cavity.

User input buttons 415 through 455 are used to save and load target profiles. Button 415 permits the user to close the screen. When this button is clicked, the current group of profiles will take effect for the recipe being profiled. Cancel button 425 is used to ignore current profile changes and revert back to the original profiles and close the screen. Read Trace button 435 is used to load an existing and saved target profile from memory. The profiles can be stored in memory contained in the interface 215 or the controller 210. Save trace button 440 is used to save the current profile. Read group button 445 is used to load an existing recipe group. Save group button 450 is used to save the current group of target profiles for a group of nozzle valve pins. The process tuning button 455 allows the user to change the PID settings (for example, the gains) for a particular nozzle valve in a control zone. Also displayed is a pressure range 465 for the injection molding application.

Figure 13:
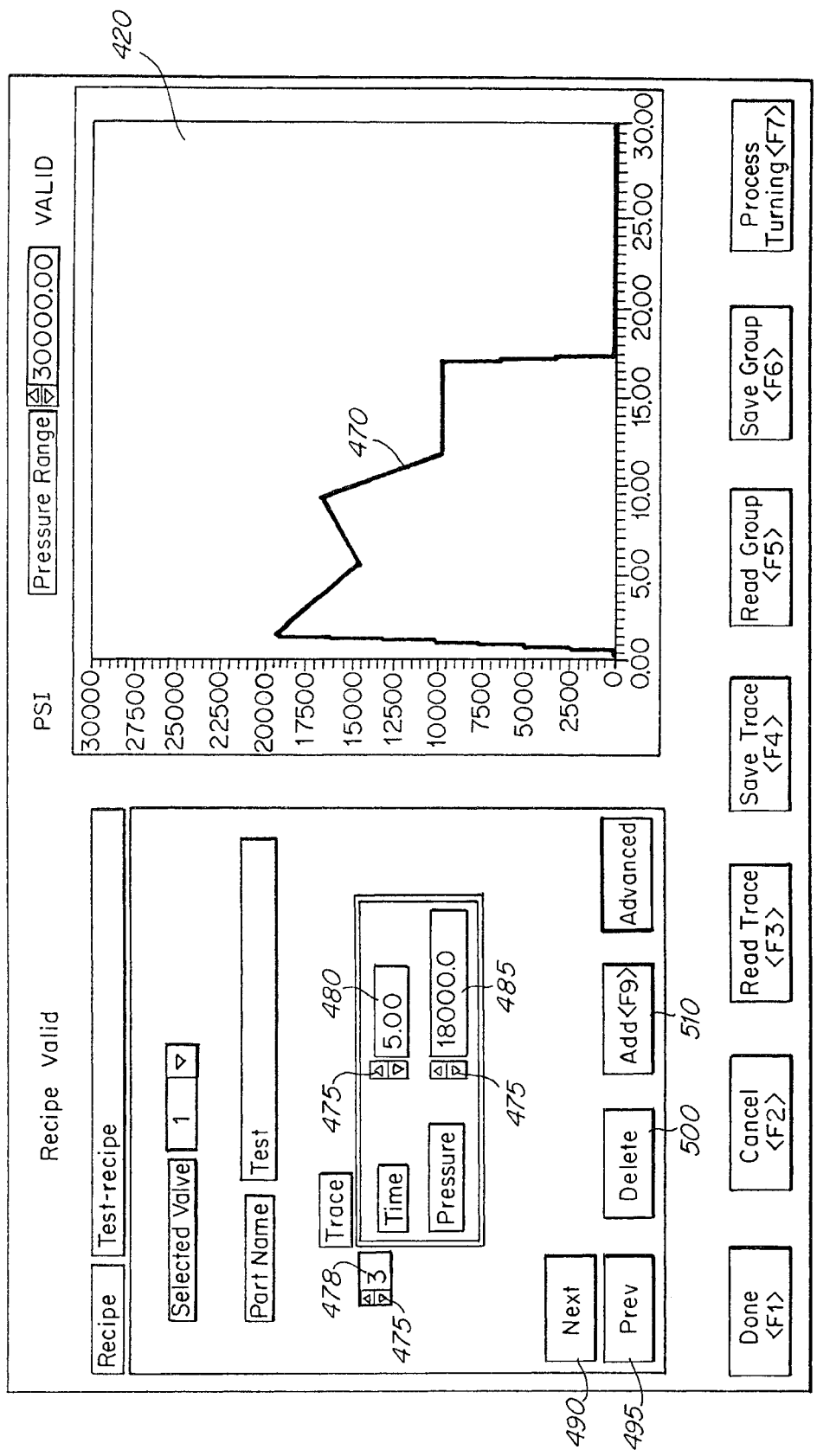
FIG. 13 is another example of a user interface displaying component and function fields that enable a user to display, use, create, edit and store target pressure profiles.

Button 460 permits the user to toggle to an "advanced" mode profile creation and editing screen. The advanced profile creation and editing screen is shown in FIG. 13. The advanced mode allows a greater number of profile points to be inserted, edited, or deleted than the basic mode. As in the basic mode, as the profile is changed, the resulting profile is displayed. The advanced mode offers greater profitability because the user can select values for individual time and pressure data pairs. As shown in the graph 420, the profile 470 displayed is not limited to a single pressure for fill and pack, respectively, as in the basic mode. In the advanced mode, individual (x, y) data pairs (time and pressure) can be selected anywhere during the injection cycle.

To create and edit a profile using advanced mode, the user can select a plurality of times during the injection cycle (for example 16 different times), and select a pressure value for each selected time. Using standard windows-based editing techniques (arrows 475) the user assigns consecutive points along the profile (displayed at 478), particular time values displayed at 480 and particular pressure values displayed at 485.

The button 490 is used to select the next point on the profile for editing. Prev button 495 is used to select the previous point on the profile for editing. Delete button 500 is used for deleting the currently selected point. When the delete button is used the two adjacent points will be redrawn showing one straight line segment.

The add button 510 is used to add a new point after the currently selected point in which time and pressure values are entered for the new point. When the add button is used the two adjacent points will be redrawn showing two segments connecting to the new point.

Where a position sensor PS0, PS1, PS2 is included in the system to measure or monitor the position of a valve pin or actuator, the processor, memory, display or user interface (16) can be configured to include an algorithm that controls the position of the valve pin 1040, 1041, 1042 based on signals generated by the positions sensors and sent to the controller 16, the signals being indicative of the position of the valve pin or actuator. The processor 16 can utilize the received position signals in an algorithm that instructs the drivers of the actuator to move the valve pin initially from a gate closed position to one or more positions where the rate of fluid flow is at a reduced rate relative to a high rate of flow or a maximum rate of flow allowed by the interfacing of the valve pin with the complementary control surface of the downstream feed channel. The algorithm can include instructions that further trigger the driver to drive the valve pin to one or more positions at which the flow rate of injection fluid is a high rate or a maximum rate of flow when the position sensor sends a signal to the controller and algorithm that the valve pin has reached a selected axial position at which the fluid flow rate is reduced.

In a typical system 10 as shown in FIG. 2 an inlet 18a feeds molten material 18 from an injection molding machine 13 to a distribution channel 17, 19 of a manifold 40. The distribution channel 19 commonly feeds three separate nozzles 20, 21, 23 which all commonly feed into a common cavity 30 of a mold 300. One of the nozzles 20 is controlled by actuator 940 and arranged so as to feed into cavity 30 at an entrance point or gate that is disposed at about the center 32 of the cavity. As shown, a pair of lateral nozzles 21, 23 feed into the cavity 30 at gate locations that are distal 34, 36 to the center gate feed position 32. As shown in FIG. 2, position sensors PS0, PS1, PS2 are included for sensing the position of the actuator rotor and their associated valve pins (such as 1040, 1041, 1042) and feed such position information to processor 16 (e.g., controller, microcontroller, microprocessor, or the like).

As shown in the FIG. 2 embodiment, fluid material is injected from an injection machine into a distribution channel 19 (e.g., a manifold runner) and further downstream into the bores of the lateral nozzles 21, 23 and ultimately downstream through the gates at the center and distal gate positions 32, 34, 36. At the beginning of the cycle the pins are disposed in a stop fluid flow position such as shown in FIGS. 5, 5C. However in one embodiment, the pins 1041, 1042 can be initially to intermediate positions where, a gap 103g is formed that restricts the velocity of fluid material flow to a selected reduced rate on account of the restriction gap that is formed between the outer surfaces 102t of the outer surface of the control surfaces of the pins 107t and the inner surfaces 103t of the complementary control surface of the channel 1621. The intermediate restricted flow position remains small enough to restrict and reduce the rate of flow of fluid material through lateral gates at distal gate positions 34, 36 to a rate that is less than maximum flow velocity over a selected travel distance of the valve pin.

When the lateral gates at distal gate positions 34, 36 are opened and fluid material is allowed to first enter the mold cavity into the stream that has been injected from center nozzle 20 past distal gate positions 34, 36, the two streams mix with each other. If the velocity of the fluid material is too high, such as often occurs when the flow velocity of injection fluid material through lateral gates at distal gate positions 34, 36 is at maximum, a visible line or defect in the mixing of the two streams will appear in the final cooled molded product at the areas where lateral gates at distal gate positions 34, 36 inject into the mold cavity. By injecting at a reduced flow rate for a relatively short period of time at the beginning when the lateral gates at distal gate positions 34, 36 are first opened and following the time when fluid first enters the flow stream, the appearance of a visible line or defect in the final molded product can be reduced or eliminated.

Thus the position of one or more of the valve pins 1041, 1042 starting initially from the stop flow position, FIG. 5C can be controlled via controller 16 to limit the rate of injection fluid flow at the beginning of the cycle to a reduced rate and subsequently driven upon detection of the position of the valve pin at a selected one of the reduced rate position to one or more positions such as shown in FIG. 5E where injection fluid flow is at a high rate or maximum rate relative to the reduced rate so that injection fluid can flow into the cavity at a high rate or maximum rate to fill the cavity in a reduced amount of time.

What is claimed is:

1. An injection molding apparatus comprising:
   an injection molding machine;
   a controller arranged to generate drive signals or cause a generation of drive signals;
   a manifold arranged to receive an injection material under pressure from the injection molding machine and to deliver at least some of the injection material into a cavity of a mold;
   a gate leading to the cavity of the mold;
   a valve pin having a shaft, the shaft having an axis;
   an actuator controllably drivable by electric power, the actuator having a driver arranged to drive the valve pin wherein the valve pin is interconnected at an upstream end to the actuator in an arrangement that permits the valve pin to be controllably drivable by the actuator along a linear path of travel upstream and downstream through a downstream feed channel, the downstream feed channel arranged to receive and deliver at least some of the injection material into the cavity, the valve pin and the downstream feed channel being adapted to interface with each other to vary rate or velocity of flow of the injection material to and through the gate;
   an electrical drive device having an interface arranged to receive the drive signals and controllably distribute electrical energy to the actuator driver in controllably varied amounts according to the drive signals; and
   a pressure sensor arranged to sense pressure of the injection material within a channel upstream and away from the gate, wherein the controller is arranged to execute a program that receives signals from the pressure sensor indicative of the sensed pressure, the program having instructions that generate the drive signals based on the received signals, the drive signals being sent to the driver via the electrical drive device, the instructions controlling interfacing of the valve pin and the downstream feed channel to control the rate or velocity of flow of the injection material during the course of an injection cycle;
   wherein the actuator has a housing that houses the actuator driver, the electrical drive device being housed within or by the housing or being mounted on or to the housing, and wherein the housing is mounted in proximity or disposition relative to a heated manifold such that one or the other or both of the housing and the electrical drive is or are in substantial heat communication or contact with the heated manifold.

2. An apparatus according to claim 1 wherein the program includes instructions that utilize a position signal to adjust axial position of the valve pin by a travel distance or amount that causes interfacing of the valve pin with the downstream feed channel to adjust real time pressure of the injection material at one or more times over the course of the injection cycle to a value that approaches or matches a predetermined target pressure value for the one or more times over the course of the injection cycle.

3. An apparatus according to claim 2 wherein the program includes instructions that utilize a predetermined error value to determine the travel distance, the predetermined error value corresponding or being proportional to one or more of (a) an error in accuracy of the value of sensed pressure and (b) a difference in value between sensed pressure and the predetermined target pressure.

4. An apparatus according to claim 1 wherein the valve pin and the downstream feed channel interface with each other to vary rate or velocity of flow of injection material at an axial position upstream and away from the gate.

5. An apparatus according to claim 1 wherein the pressure sensor senses pressure of the injection material, the pressure sensor generating a signal indicative of sensed pressure that is received at the controller, the instructions being adapted to compare the sensed pressure to a target pressure and adjust axial position of the valve pin such that injection material pressure is adjusted to track the target pressure.

6. An apparatus according to claim 1 wherein the pressure sensor is adapted to sense the injection material pressure at a position downstream of an axial position at which the valve pin and the downstream channel interface with each other to vary rate or velocity of flow of the injection material.

7. An apparatus according to claim 1 wherein the valve pin includes a control surface and the downstream feed channel has a complementary surface adapted to interface with the control surface to controllably vary rate or velocity of flow according to controlled axial positioning of the control surface relative to the complementary surface of the downstream feed channel.

8. An apparatus according to claim 1 wherein the electrical drive device includes a pulse-width modulator (PWM) that converts received electrical energy or power into waveforms or duty cycles, each waveform or duty cycle being adapted to drive a corresponding phase-coil of the actuator driver.

9. An apparatus according to claim 8 wherein the pulse-width modulator (PWM) includes an inverter or a comparator.

10. An apparatus according to claim 1 wherein the electrical drive includes one or the other or both of a digital signal receiving and transmitting device, wherein: the digital signal receiving and transmitting device is adapted to receive and transmit digital signals between the electrical drive and the controller of the injection molding apparatus, and wherein the digital signals include one or more control signals, where the one or more control signals are digital control signals received from the controller.

11. An apparatus according to claim 1 wherein the housing of the actuator is interconnected to a linear travel converter in an arrangement wherein the valve pin is adapted to be driven along a linear axis (X) that is non coaxial relative to a drive axis (Y), the linear travel converter being mounted on or to or disposed in heat conductive communication with the heated manifold.

12. An apparatus according to claim 1 wherein the valve pin has an upstream end coupled to the driver, a downstream end that closes the gate on downstream movement of the valve pin to a gate closed position, a control surface being disposed in a selected axial position intermediate the upstream and downstream ends that is adapted to interact with a complementary surface to decrease rate of material flow on upstream movement of the valve pin through a selected path of travel and to increase rate of material flow on downstream movement of the valve pin through the selected path of travel.

13. An injection molding apparatus comprising:
   an injection molding machine,
   a controller arranged to generate drive signals or cause a generation of drive signals,
   a manifold arranged to receive an injection material under pressure from the injection molding machine and to deliver at least some of the injection material into a cavity of a mold having a cavity,
   a valve pin having a shaft, the shaft having an axis (X), at least one actuator controllably drivable by electric power, the actuator having a driver arranged to drive the valve pin, the valve pin being interconnected at an upstream end to the driver in an arrangement wherein the valve pin is controllably drivable by the driver along a linear path of travel upstream and downstream through a downstream feed channel arranged to receive and deliver at least some of the injection material into the cavity, the valve pin and the downstream feed channel being adapted to interface with each other to vary rate or velocity of flow of the injection material to and through a gate leading to the cavity of the mold, an electrical drive device having an interface arranged to receive the drive signals and controllably distribute electrical energy to the driver in controllably varied amounts according to the drive signals, the electrical drive device and the controller being adapted to receive and transmit digital signals between the electrical drive device and the controller, wherein the digital signals include one or more drive signals received by the electrical drive device from the controller, the controller having a program that receives signals from one or more of a pressure sensor that senses pressure of the injection material or a position sensor that senses position of the actuator or the valve pin, the program having instructions that generate the drive signals based on the received signals, the drive signals being sent to the driver via the electrical drive device, the instructions controlling interfacing of the valve pin and the downstream feed channel to control the rate or velocity of flow of the injection material during the course of an injection cycle;

wherein the actuator has a housing that houses the driver, the electrical drive device being housed within or by the housing or being mounted on or to the housing, wherein the housing is mounted in proximity or disposition relative to a heated manifold such that one or the other or both of the housing and the electrical drive is or are in substantial heat communication or contact with the heated manifold.

14. Apparatus according to claim 13 wherein the digital control signals received by the actuator include one or more of differential position commands, differential current commands, and differential velocity commands.

15. Apparatus according to claim 13 wherein the digital signals include one or more feedback signals from the actuator to the controller corresponding to operation of one or more of the actuator and an actuator rotor.

16. Apparatus according to claim 13 wherein the valve pin and the downstream channel are adapted to interface with each other to vary rate or velocity of flow of the injection material at an axial position upstream and away from the gate.

17. Apparatus according to claim 13 wherein the electrical drive device includes a pulse-width modulator (PWM) that converts received electrical energy into waveforms or duty cycles, each waveform or duty cycle being adapted to drive a corresponding phase-coil of the actuator driver.

\* \* \* \* \*